(12) United States Patent
Iwata

(10) Patent No.: US 11,731,272 B2
(45) Date of Patent: Aug. 22, 2023

(54) ROBOT, CONTROL DEVICE, AND INFORMATION PROCESSING DEVICE

(71) Applicant: CANON KABUSHIKI KAISHA, Tokyo (JP)

(72) Inventor: Masumitsu Iwata, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 121 days.

(21) Appl. No.: 17/178,616

(22) Filed: Feb. 18, 2021

(65) Prior Publication Data

US 2021/0283774 A1 Sep. 16, 2021

(30) Foreign Application Priority Data

Mar. 12, 2020 (JP) .................. 2020-043049

(51) Int. Cl.
*B25J 9/16* (2006.01)
*B25J 13/08* (2006.01)
*B25J 13/06* (2006.01)

(52) U.S. Cl.
CPC ......... *B25J 9/1664* (2013.01); *B25J 9/1651* (2013.01); *B25J 9/1653* (2013.01); *B25J 9/1674* (2013.01); *B25J 13/06* (2013.01); *B25J 13/085* (2013.01); *B25J 13/088* (2013.01)

(58) Field of Classification Search
CPC ...... B25J 9/1664; B25J 9/1651; B25J 9/1653; B25J 9/1674; B25J 13/06; B25J 13/085; B25J 13/088; B25J 9/1602; B25J 13/081; B25J 9/163; B25J 9/1633; B25J 19/02; B25J 19/06; B25J 19/063; B25J 9/0081; G05B 2219/39319; G05B 19/409; G05B 2219/40414; G05B 2219/35468; G05B 2219/36425; G05B 2219/23377; G05B 2219/13031; G05B 2219/37043;
(Continued)

(56) References Cited

U.S. PATENT DOCUMENTS 9,134,722 B2 9/2015 Iwata ................. G05B 19/4067
2013/0310974 A1 11/2013 Iwata ........................... 700/245
2018/0200881 A1 7/2018 Ishii
(Continued)

FOREIGN PATENT DOCUMENTS

CN 108789403 A 11/2018
JP 2018-111174 A 7/2018
(Continued)

OTHER PUBLICATIONS

Chinese Office Action dated Jun. 17, 2023, during prosecution of related Chinese Application No. 202110249417.1 (English translation included).

*Primary Examiner* — Bhavesh V Amin
*Assistant Examiner* — Esvinder Singh
(74) *Attorney, Agent, or Firm* — Venable LLP

(57) ABSTRACT

A robot includes an input detection portion, a motion detection portion, and a control portion. The input detection portion is configured to detect an input given from an operator to a robot body. The motion detection portion is configured to detect a motion by using the input detection portion, the motion being given by the operator. The control portion is configured to execute a motion instruction associated with the motion detected by the motion detection portion.

30 Claims, 19 Drawing Sheets

(58) Field of Classification Search
CPC ........... G05B 2219/40198; G05B 2219/40202;
G05B 2219/40201
See application file for complete search history.

(56) References Cited

U.S. PATENT DOCUMENTS

| | | | | |
|---|---|---|---|---|
| 2018/0281173 | A1* | 10/2018 | Hane | B25J 9/1664 |
| 2018/0311814 | A1* | 11/2018 | Kamisono | B25J 13/086 |
| 2019/0240839 | A1* | 8/2019 | Jung | B25J 13/06 |
| 2020/0171649 | A1* | 6/2020 | Nakayama | B25J 19/0004 |
| 2020/0198120 | A1 | 6/2020 | Hashimoto | |
| 2021/0001484 | A1* | 1/2021 | Bogart | B25J 13/088 |
| 2021/0039262 | A1* | 2/2021 | Maillet | B25J 13/085 |
| 2021/0268660 | A1* | 9/2021 | Okuyama | B25J 9/1697 |
| 2021/0362343 | A1* | 11/2021 | Kim | B25J 13/089 |
| 2022/0016764 | A1* | 1/2022 | Yoshida | B25J 9/1653 |

FOREIGN PATENT DOCUMENTS

| | | |
|---|---|---|
| JP | 2018-192601 A | 12/2018 |
| JP | 2019-30935 A | 2/2019 |
| JP | 2019-93522 A | 6/2019 |
| WO | 2019/190487 A1 | 10/2019 |

\* cited by examiner

FIG.11A
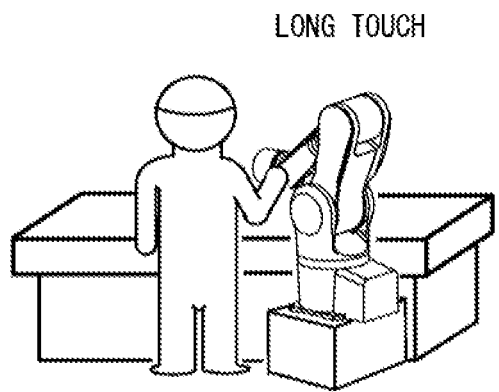
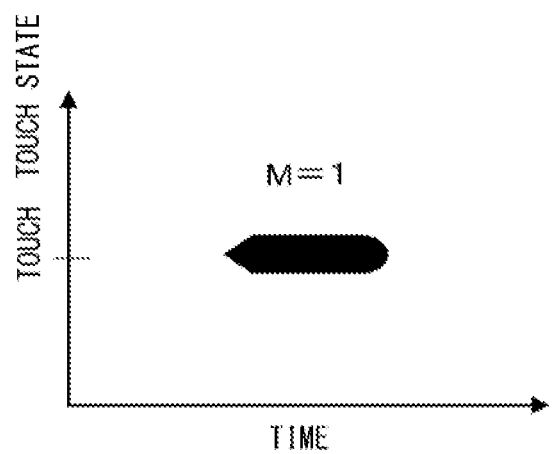
FIG.11B
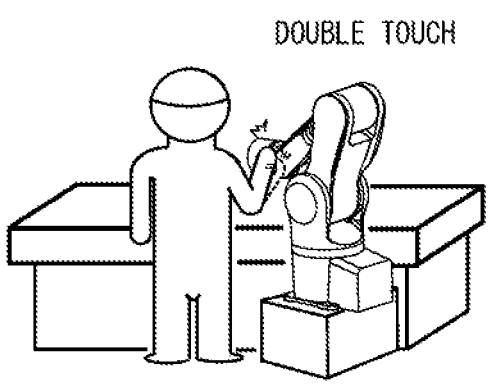
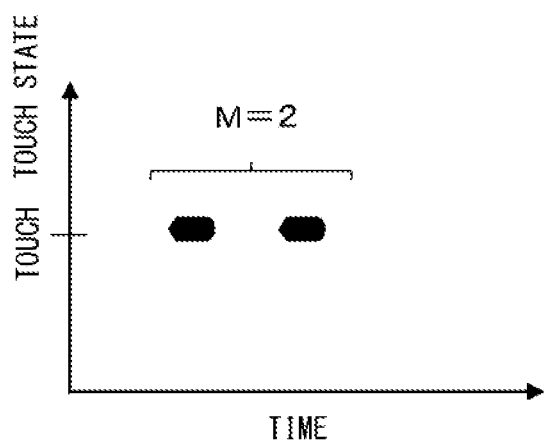
FIG.11C
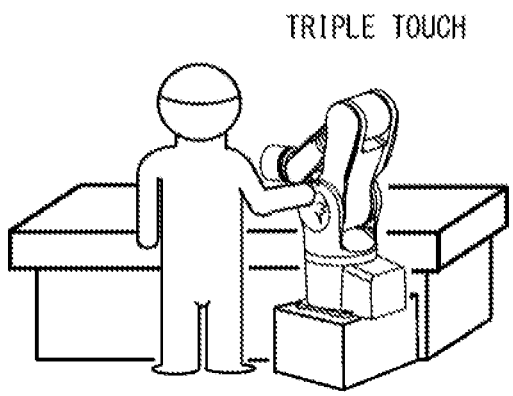
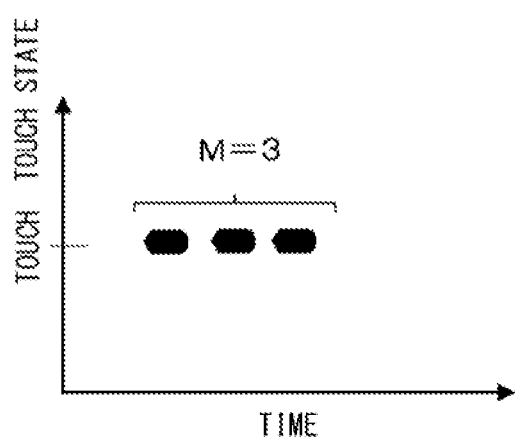

FIG.12A
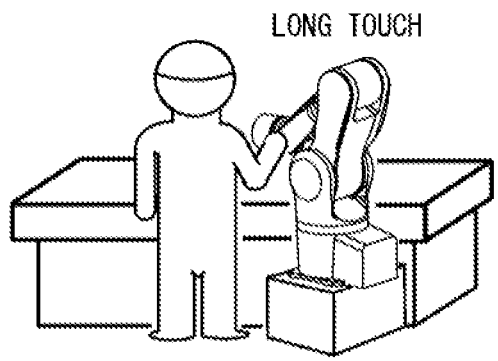
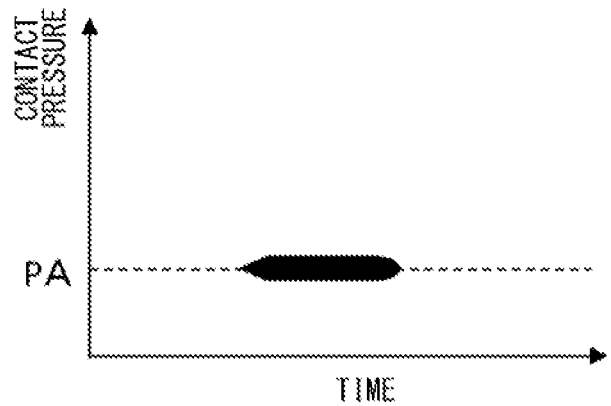
FIG.12B
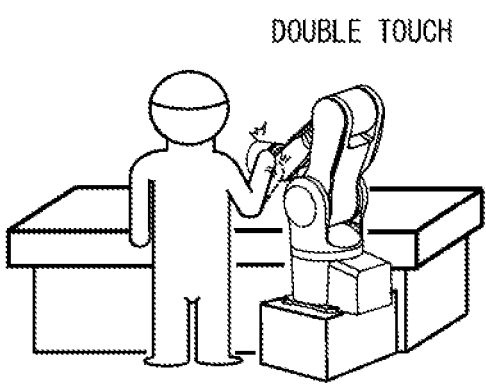
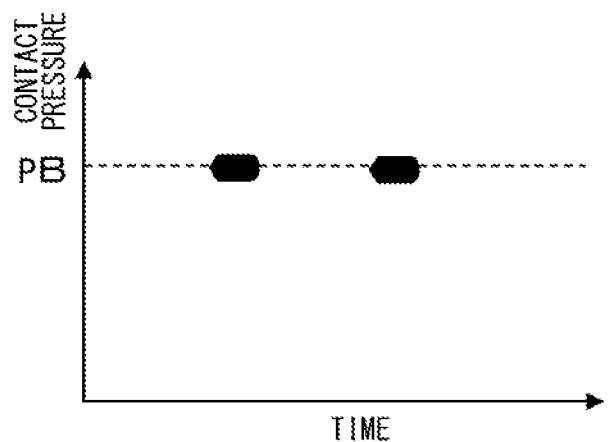
FIG.12C
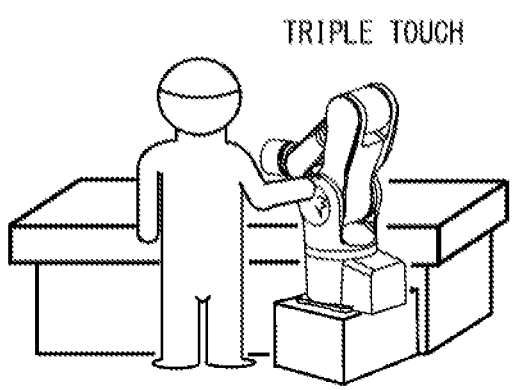
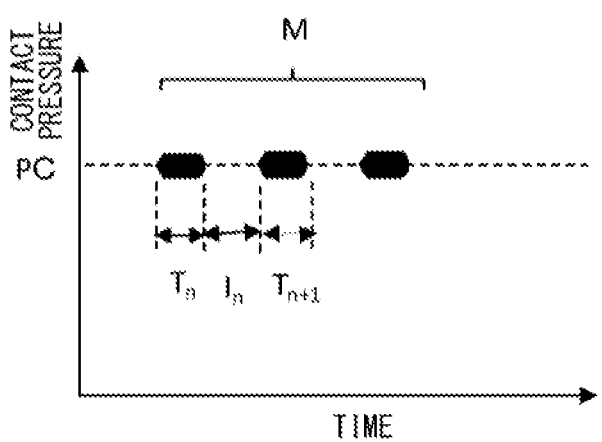

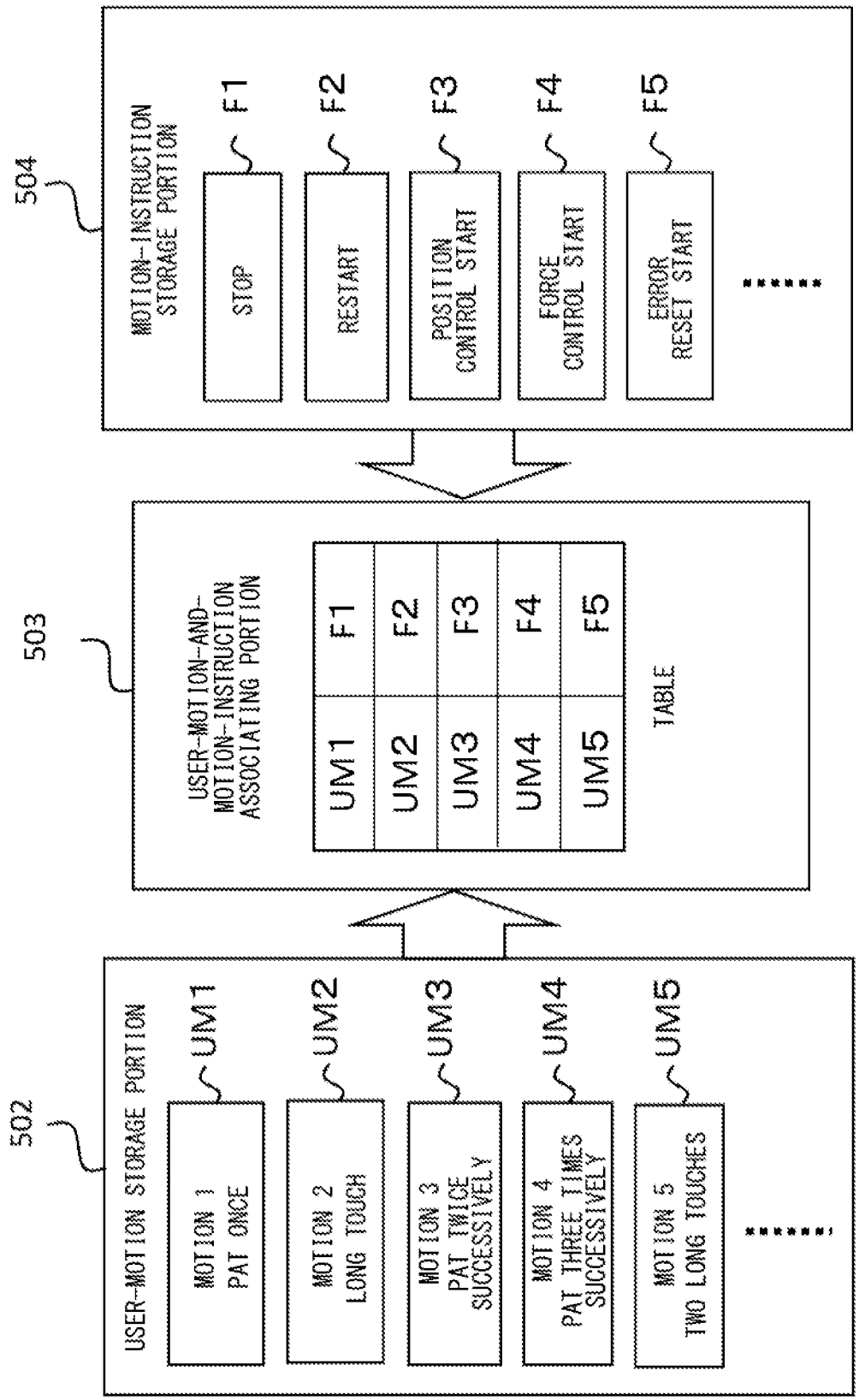

ROBOT, CONTROL DEVICE, AND INFORMATION PROCESSING DEVICE

BACKGROUND OF THE INVENTION

Field of the Invention

The present invention relates to a robot and the like.

Description of the Related Art

In recent years, robots that perform collaborative work with humans have been developed.

For increasing the efficiency of collaborative work, it is important for a human to give a motion instruction appropriately and easily to a robot when they are performing the collaborative work.

For example, Japanese Patent Application Publication No. 2019-93522 proposes a robot system in which a motion instruction is given to a robot. In the robot system, a voice-based motion instruction is given to the robot for causing the robot to work together with a peripheral device for performing work on a workpiece.

When a human and a robot perform collaborative work in a position where they are close to each other, it is convenient if a voice-based motion instruction is given to the robot, as disclosed in Japanese Patent Application Publication No. 2019-93522.

However, in a case where the robot is an industrial robot in particular, there are other industrial machines installed around the robot and producing noise. The noise from the other machines, the operating sound produced by the robot itself, and the work sound produced in the work (e.g., machining) performed by the robot may prevent the voice-based motion instruction from being accurately recognized. If the human had to give an extremely loud voice to the robot for reliably giving the voice-based motion instruction to the robot, or move from the vicinity of the robot to a silent position for giving a voice to the robot, the efficiency of the collaborative work would be lowered.

Thus, in the field of working robots, a method of accurately giving a motion instruction to a robot has been desired.

SUMMARY OF THE INVENTION

According to a first aspect of the present invention, a robot includes an input detection portion, a motion detection portion, and a control portion. The input detection portion is configured to detect an input given from an operator to a robot body. The motion detection portion is configured to detect a motion by using the input detection portion, the motion being given by the operator. The control portion is configured to execute a motion instruction associated with the motion detected by the motion detection portion.

According to a second aspect of the present invention, a control device includes a motion detection portion and a control portion. The motion detection portion is configured to detect a motion by using an input detection portion, the input detection portion being configured to detect an input given from an operator to a robot body, the motion being given by the operator. The control portion is configured to cause the robot body to execute a motion instruction associated with the motion detected by the motion detection portion.

According to a third aspect of the present invention, an information processing device includes a motion detection portion and a control portion. The motion detection portion is configured to detect a motion by using an input detection portion, the input detection portion being configured to detect an input given from an operator to a robot body, the motion being given by the operator. The control portion is configured to output a motion instruction associated with the motion detected by the motion detection portion.

According to a fourth aspect of the present invention, a control method includes detecting an input given from an operator to a robot body, detecting a motion given by the operator, and causing the robot body to execute a motion instruction associated with the detected motion.

Further features of the present invention will become apparent from the following description of exemplary embodiments with reference to the attached drawings.

BRIEF DESCRIPTION OF THE DRAWINGS

FIG. 11A is a diagram illustrating one example of user motion.

FIG. 11B is a diagram illustrating another example of user motion.

FIG. 11C is a diagram illustrating still another example of user motion.

FIG. 12A is a diagram illustrating one example of user motion.

FIG. 12B is a diagram illustrating another example of user motion.

FIG. 12C is a diagram illustrating still another example of user motion.

FIG. 13 is a schematic diagram for illustrating a user-motion-and-motion-instruction associating process.

DESCRIPTION OF THE EMBODIMENTS

Figure 1:
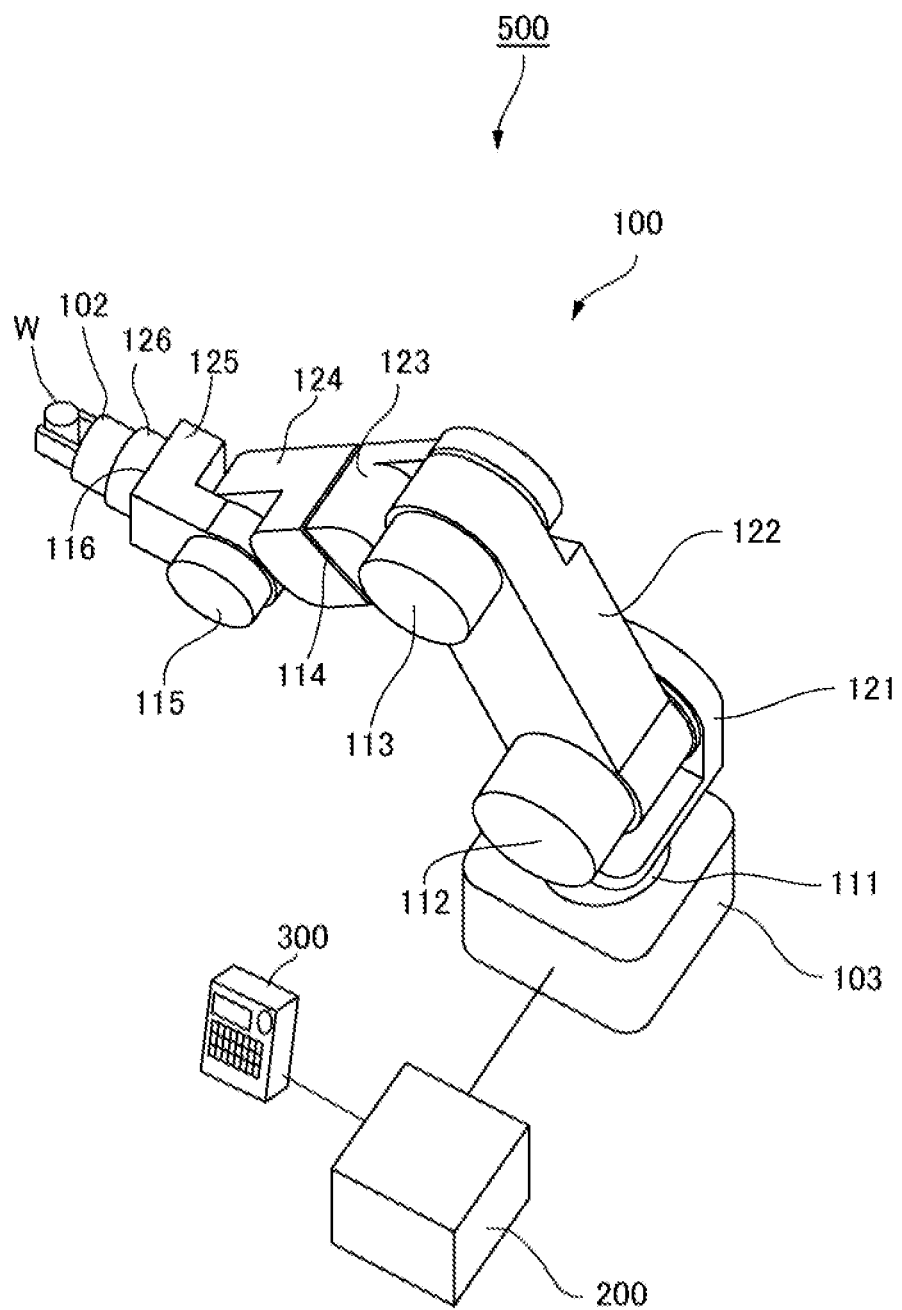
FIG. 1 is a perspective view schematically illustrating an external appearance of a robot of a first embodiment.

Hereinafter, some embodiments of the present invention will be described with reference to the accompanying drawings. Specifically, the description will be made for a robot that performs collaborative work together with a human, a control device that controls the robot that performs collaborative work together with a human, a method of controlling the robot that performs collaborative work together with a human, and the like.

Note that in the drawings that will be referred to in the description of the following embodiments, a component given an identical reference symbol has an identical function, unless specified otherwise.

First Embodiment

Robot

In a first embodiment, an industrial robot having a six-axis-control robot arm will be described. However, the present embodiment of the present invention is not limited to this type of robot, and the present invention can be applied for various types of robot as long as each of the robots can perform collaborative work together with a human in a position where they are close to each other. In addition, in the present embodiment of the present invention, the number of joints of a robot and the number of axes of the robot are not limited to specific values. For example, the present embodiment can be applied for a vertically articulated robot, a SCARA robot, a parallel link robot, a Cartesian coordinate robot, a dual-arm robot, or the like. In addition, the robot may have various actuators and sensors in accordance with the collaborative work with a human.

FIG. 1 is a perspective view schematically illustrating an external appearance of a robot 500 of the first embodiment. As illustrated in FIG. 1, the robot 500 includes an articulated robot arm 100 that holds and assembles a workpiece W into a product, a control device 200 that controls the robot arm 100, and a system control panel 300 that is connected to the control device 200. The articulated robot arm 100 is a six-axis-control robot arm, and has a hand (end effector) 102 connected to a leading end of the robot arm 100.

The robot arm 100 includes a base portion 103 fixed to a workbench, a plurality of links 121 to 126 that transmit displacement and force, and a plurality of joints 111 to 116 that pivotably or rotatably link the plurality of links 121 to 126 to each other. For causing the robot 500 to perform work, the control device 200 controls the position and posture of the robot arm 100 by driving the joints 111 to 116.

When the robot 500 performs collaborative work together with a human, the control device 200 detects that the human touches the robot arm 100 (or inputs a user motion, by using an output signal from a torque detection device of each of the joints 111 to 116; and analyzes (detects) the way of touching (i.e., touch pattern). That is, in the present embodiment, the torque detection device functions as a touch detection portion that detects a touch of an operator to the robot body, and a user-motion analysis portion that serves as a motion detection portion detects a motion of the operator by using the output signal from the torque detection device. In other words, the control device 200 analyzes (detects) the motion of the human when the human touches the robot arm 100. After detecting the touch pattern (motion) of the human obtained when the human touches the robot arm 100, the control device 200 controls the motion of the robot in accordance with a motion pattern (instruction) that has beau stored in advance and associated with the detected motion.

The system control panel 300, which is connected to the control device 200, is used as an input/output device when an operator teaches a motion to the robot 500 or sends an instruction to the robot 500. The system control panel 300 includes an input portion, through which an operation instruction is inputted; and a display portion which displays the information on the state of the robot arm and the like. In addition, the system control panel 300 may include an emergency stop switch. In the present embodiment, the system control panel 300 can also be used for causing the control device 200 to learn a touch pattern (motion) of a human, and for causing the control device 200 to associate a motion pattern with the motion of the human and store the motion pattern.

Figure 2:
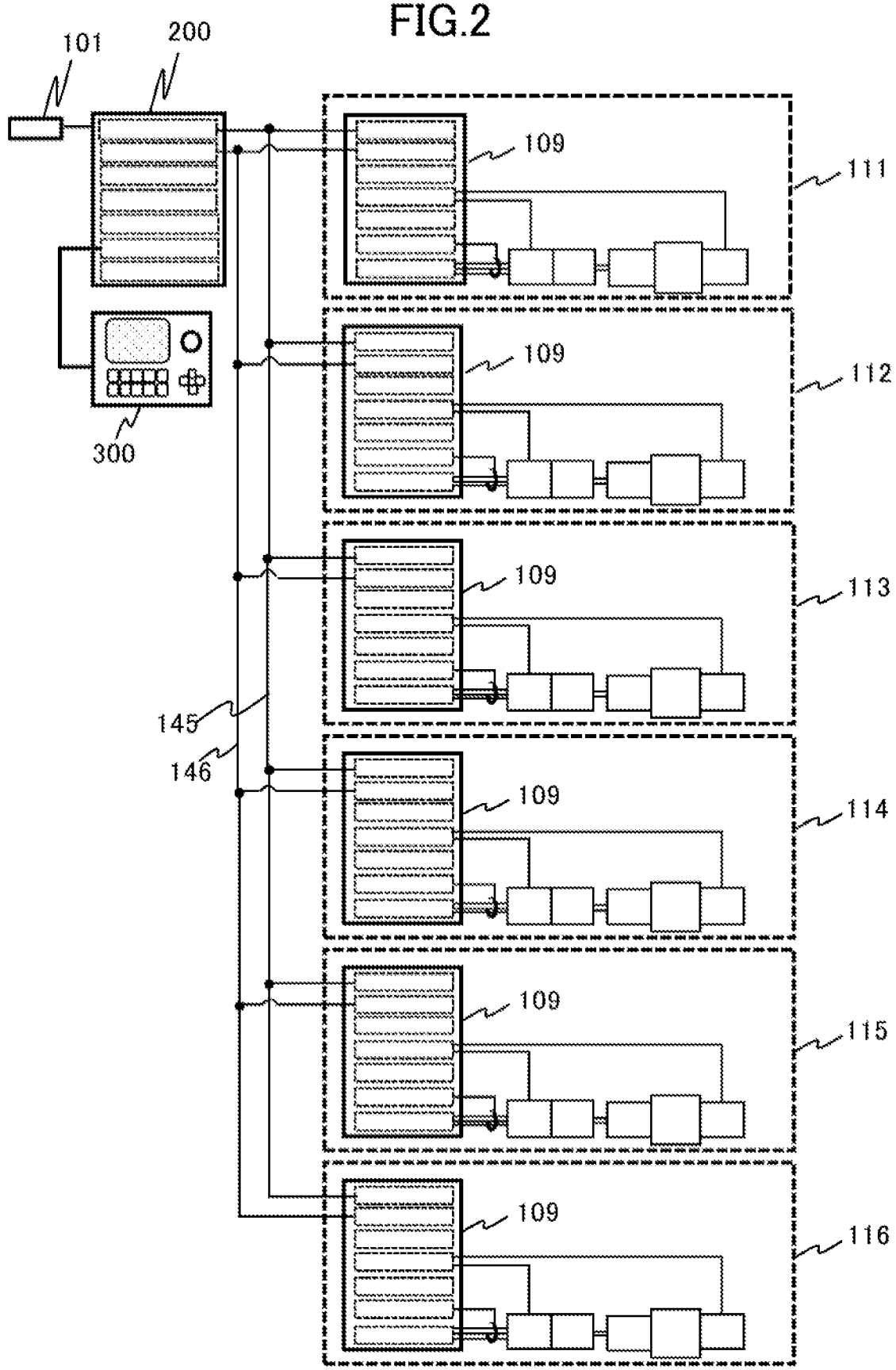
FIG. 2 is a diagram illustrating electrical connection of the robot of an embodiment.
Figure 3A:
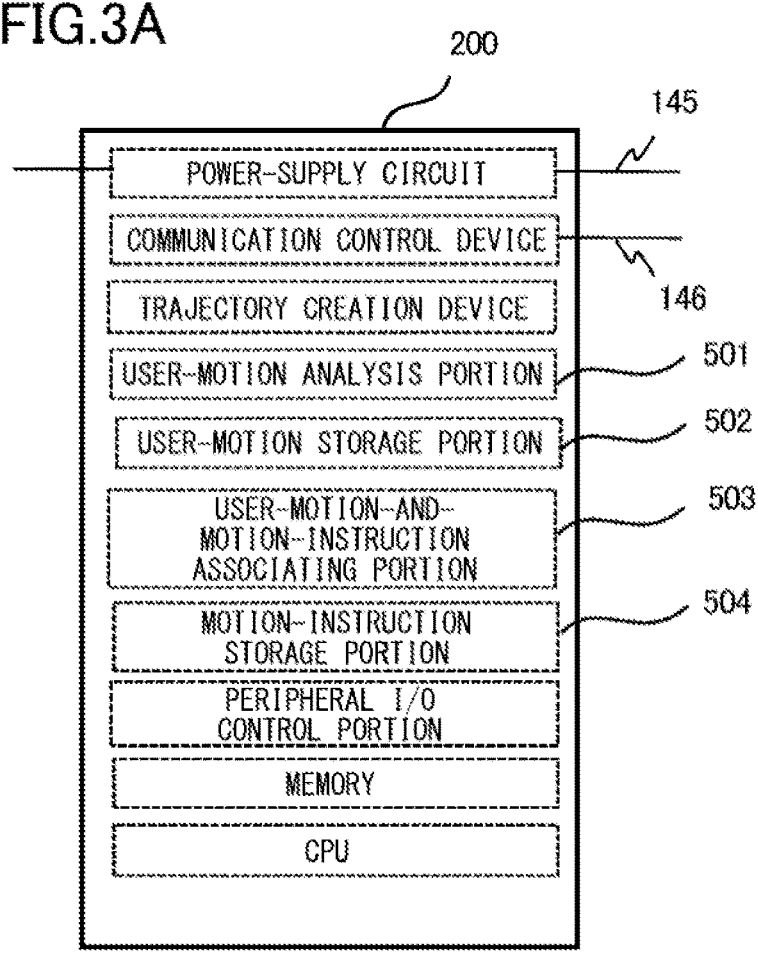
FIG. 3A is a block diagram illustrating an internal configuration of a control device of an embodiment.
Figure 3B:
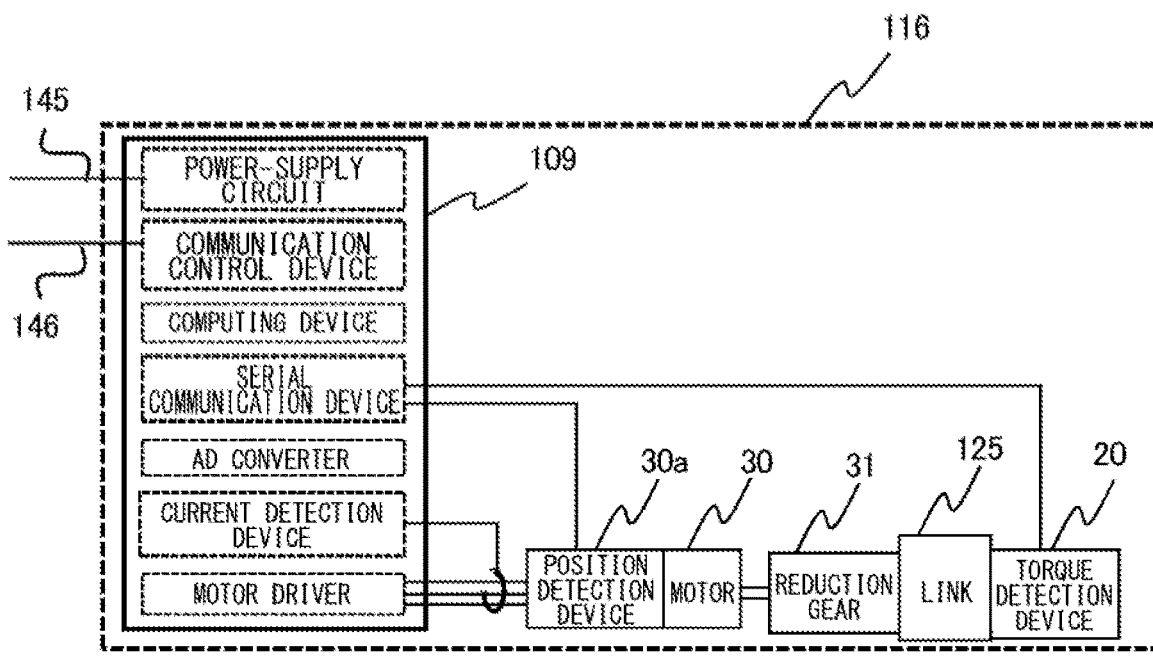
FIG. 3B is a block diagram illustrating an internal configuration of a joint of the robot of an embodiment.

FIG. 2 is a diagram illustrating electrical connection of the robot 500. FIG. 3A is a block diagram for illustrating an internal configuration of the control device 200. FIG. 3B is a block diagram for illustrating an internal configuration of joint of the robot arm.

In FIG. 2, a power-supply device 101, the control device 200, the system control panel 300, and the joints 111 to 116 are illustrated.

The power-supply device 101 supplies electric power to the whole system. For example, the power-supply device 101 supplies alternating-current power to a power-supply circuit (see FIG. 3A) of the control device 200. The power-supply circuit of the control device 200 converts the alternating-current power to direct-current power, and supplies the direct-current power to a power-supply circuit (see FIG. 3B) of each of the joints 111 to 116, via a power supplying line 145. Note that another method other than the above-described power supplying method may be used for supplying power to each component.

The control device 200 is connected to the joints 111 to 116 via a communication line 146, through which the control device 200 can transmit a control signal. The control device 200 controls the position and posture of the robot arm 100 by controlling the motion of the joints 111 to 116.

As illustrated in FIG. 3A, the control device 200 includes the power-supply circuit, a communication control device, a trajectory creation device, a peripheral I/O control portion, a memory, and a CPU. In addition, the control device 200 includes a user-motion analysis portion 501, a user-motion storage portion 502, a user-motion-and-motion-instruction associating portion 503, and a motion-instruction storage portion 504. The operation of these function blocks will be described later, associated with the robot-motion control that is performed in accordance with a user motion.

The joints 111 to 116 illustrated in FIG. 2 have the same or a similar internal configuration. Thus, in the present embodiment, the internal configuration of the joint 116 will be described, as an example, with reference to FIG. 3B.

The joint 116 includes a joint control portion 109, a position detection device 30a, a motor 30, a reduction gear 31 that reduces rotation transmitted from the motor 30, and a torque detection device 20 that detects the torque applied to the joint 116.

The joint control portion 109 is a control circuit that includes the power-supply circuit, a communication control device, a computing device, a serial communication device, an AD converter, a current detection device, and a motor driver.

The communication control device is connected with the control device 200 via the communication line 146, and sends/receives a signal to/from the control device 200, for example, on a cycle of 10 milliseconds. The communication control device transmits a signal to the control device 200. For example, the signal is an output signal from the position detection device 30a, an output signal from the torque detection device 20, a signal into which the output signal from the position detection device 30a or the torque detection device 20 has been processed, or a signal that indices information on the state of the joint and contains error or alarm information. When the communication control device transmits a signal into which an output signal from the position detection device 30a or the torque detection device 20 has been processed, the output signal from the position detection device 30a or the torque detection device 20 may be processed appropriately by the computing device or the AD converter. The communication control device receives an instruction for controlling the operation of the motor 30, from the control device 200. When the communication control device receives an instruction for controlling the operation of the motor 30, from the control device 200, the joint control portion 109 drives the motor 30 by using a motor driver.

The motor 30 is a servo motor, and may be a brushless DC motor or an AC servo motor. The motor 30 is fastened to the link 125 via bolts or the like, and the power from the motor 30 is transmitted to a reduction-gear input shaft of the reduction gear 31. The position detection device 30a is directly mounted on a rotary shaft of the motor 30, and generates a pulse signal in accordance with the rotation of the motor 30 and outputs the pulse signal. Note that a brake unit may be disposed between the motor 30 and the position detection device 30a, as necessary, for keeping a posture of the robot arm 100 while the power is off. The position detection device 30a may be an optical device or a magnetic device, like a general-purpose rotary encoder.

The reduction gear 31 is suitably a strain-wave-gearing reduction gear, but may be another reduction gear. The reduction gear 31 includes the reduction-gear input shaft that receives the power from the motor 30, a reduction-gear fixing portion that holds the reduction gear 31 itself, and a reduction-gear output shaft that outputs torque whose speed has been reduced. If the reduction gear 31 is a strain-wave-gearing reduction gear, the reduction-gear input shaft includes an elliptical cam and an elastic bearing. In addition, an inner circumferential portion of the ring-shaped reduction-gear fixing portion and an outer circumferential portion of the cup-shaped reduction-gear output shaft that is an elastic member have teeth. The number of teeth of the inner circumferential portion is different from the number of teeth of the outer circumferential portion, and the teeth of the inner circumferential portion and the teeth of the outer circumferential portion mesh with each other. When the elliptical reduction-gear input shaft is rotated by the motor 30, the reduction-gear output shaft that is an elastic member elliptically deforms, and the reduction-gear output shaft and the reduction-gear fixing portion mesh with each other at both ends of the major axis of the ellipse. Thus, when the reduction-gear input shaft is rotated by the power from the motor 30, the reduction-gear output shaft meshes with the reduction-gear fixing portion while deforming in elliptical shape, and the link 126 (not illustrated in FIG. 3B) is rotated relative to the link 125 and the tongue detection device 20, which are on the reduction-gear fixing portion side.

The torque detection device 20 is a torque sensor that uses an optical encoder or the like to detect the amount of deformation of a structure, and converts the amount of deformation to a torque value. The torque detection device 20 is disposed between the link 125 and the reduction-gear fixing portion, and detects the torque applied to the joint. Note that a magnetic extender or an electrostrictive force sensor may be used as the torque detection device 20.

Figure 4:
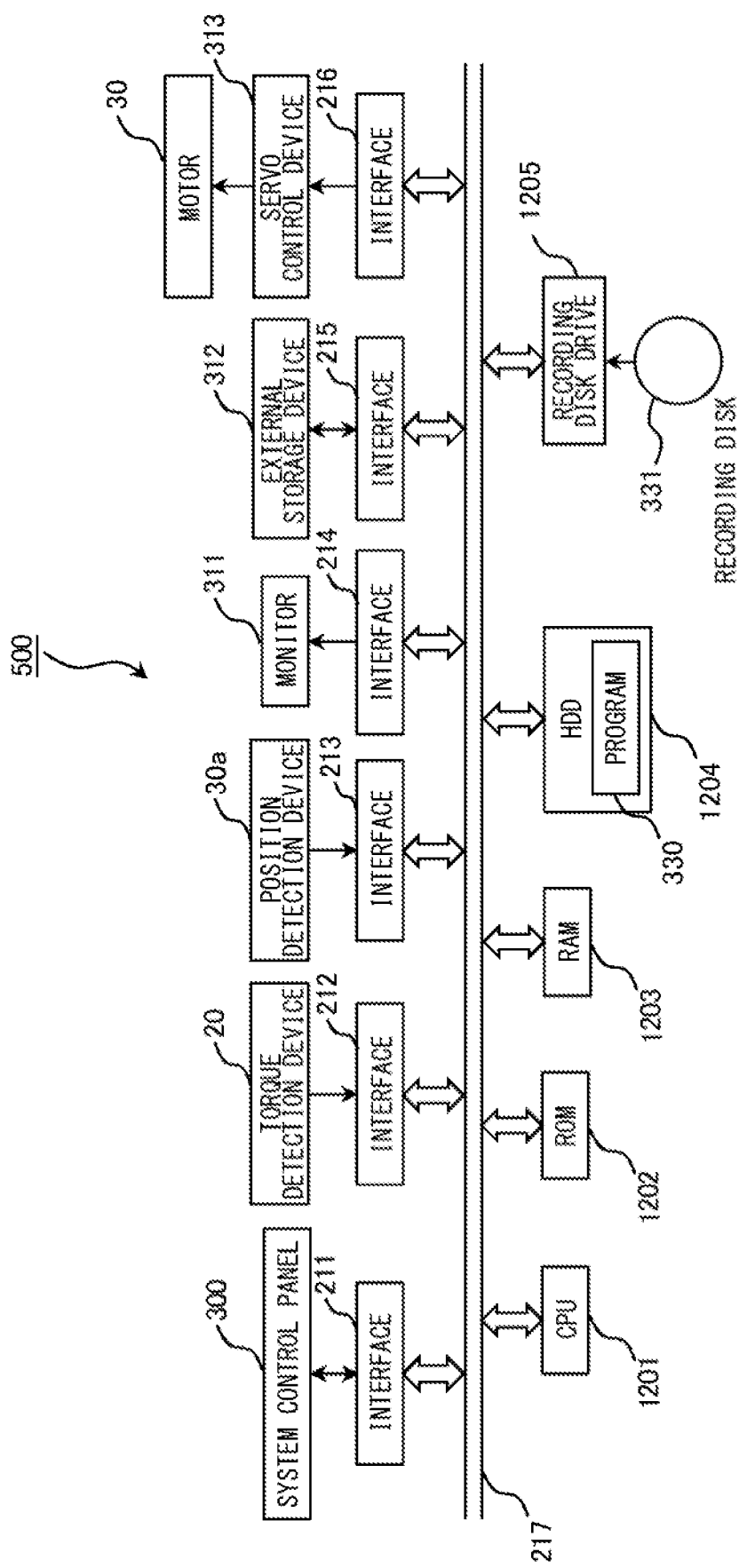
FIG. 4 is a diagram illustrating a system configuration of the robot of the first embodiment.

Next, with reference to FIG. 4, a system configuration of the robot 500 will be described.

The robot 500 includes a CPU 1201 that serves as a computing unit, a ROM 1202, a RAM 1203, a storage portion (HDD) 1204, a recording-disk drive 1205, and various interfaces 211 to 216.

The CPU 1201 is connected with the ROM 1202, the RAM 1203, the HDD 1204, the recording-disk drive 1205, and the various interfaces 211 to 216 via a bus 217. The ROM 1202 is a non-transitory recording medium, and stores a base program such as a BIOS. The RAM 1203 is a storage device that temporarily stores results of a computing process performed by the CPU 1201.

The HDD 1204 is a storage unit that stores various data, which is results of a computing process performed by the CPU 1201; and stores a program 330 that causes the CPU 1201 to execute various types of process. The CPU 1201 executes the various types of computing process, depending on the program 330 recorded (stored) in the HDD 1204, which is a recording medium. The recording-disk drive 1205 can read various types of data and a program stored in a recording disk 331.

In the present embodiment, the user-motion storage portion 502 and the motion-instruction storage portion 504, which are illustrated in FIG. 3A, are achieved in the HDD 1204. In addition, the program for achieving the function blocks, such as the user-motion analysis portion 501 and the user-motion-anti-motion-instruction associating portion 503 illustrated in FIG. 3A, are included in the program 330 stored in the HDD 1204.

The interface 211 is connected with the system control panel 300 that a user can operate.

The interface 212 is connected with the torque detection device 20, which outputs a torque detection value to the CPU 1201 via the interface 212 and the bus 217. The interface 213 is connected with the position detection device 30a, which outputs a position-detection output signal to the CPU 1201 via the interface 213 and the bus 217.

The interface 214 is connected with a display portion 311 that displays various images; the interface 215 is connected with an external storage device 312, such as a rewritable nonvolatile memory or an external HDD. The interface 216 is connected with a servo control device 313.

Depending on a driving instruction sent than the CPU 1201, the servo control device 313 calculates the amount of current to be supplied to the motor 30, supplies the current to the motor 30, and performs joint angle control on the joints 111 to 116 of the robot arm 100. For example, when performing force control, the CPU 1201 controls the motor 30 via the servo control device 313, and causes the motor 30 to drive the joints 111 to 116 so that a torque detection value (i.e., output signal from the torque sensor unit) of each of the joints 111 to 116 becomes equal to a target torque value. In addition, when performing position control, the CPU 1201 outputs instruction data, used for driving the motor 30 and indicating the amount of control on the rotation angle of the motor 30, to the servo control device 313, depending on an output signal from the position detention device 30a, at predetermined intervals via the bus 217 and the interface 216.

Robot Motion Control by Using User Motion

For causing the robot 500 to perform a motion such as a predetermined motion that has been taught, the trajectory creation device of the control device 200 creates control information, and the joints 111 to 116 are driven, depending on the control information, so that the position and posture of the robot arm 100 is controlled.

However, in a case where the robot 500 performs collaborative work together with a human, the robot 500 does not necessarily repeat a predetermined motion (for example, a robot motion that has been taught). Instead, while performing collaborative work together with a human, the robot 500 can analyze a user motion when the human touches the body of the robot 500, interpret the user motion as a motion instruction, and change the motion of the robot 500.

Note that the user motion represents regularity, style, similar type, and the like of the touch obtained when the human touches the body (typically, the robot arm 100) of the robot 500. For example, the regularity, the style, the similar type, and the like are determined, depending on a length of touch time in which the human touches a robot housing with a hand (that is, the human inputs a user motion), a strength of force, a direction of force, a cycle, the number of touches in a predetermined time, a touch position, change in touch positions, and the like. Then, the determined regularity, style, and similar type are identified as a user motion. That is, at least one of the lengths of touch time, the strength of force applied in the touch, the direction of force applied in the touch, the cycle of the touch, the number of touches in a predetermined time, the touch position, and the trace of touch position is analyzed, so that the user motion is detected.

FIGS. 11A to 11C are schematic diagrams for illustrating a plurality of patterns of user motion. FIG. 11A illustrates a user motion "long touch" in which a human keeps touching a link of the robot arm for a long time. FIG. 11B illustrates a user motion "double touch" in which a human touches a link of the robot arm, successively two times, each performed in a short time. FIG. 11C illustrates a user motion "triple touch" in which a human touches another link of the robot arm, successively three times, each performed in a short time. Thus, the control device 200 can identify these three types of user motion, for example, by analyzing the number M of times a human has touched the robot.

In addition, as illustrated in FIGS. 12A to 12C as examples, the ability for identifying user motion can be increased by analyzing not only the number M of times a human has touched a robot, but also a touch-time length Tn, a touch-time interval In, a force strength (contact pressure), and the like.

Note that the subscript n of Tn and In indicates an index of each touch event.

When a user motion is identified, a motion instruction that has been associated in advance with the user motion and stored is read, and the control device 200 executes or change a motion of the robot in accordance with the motion instruction. For example, the motion instruction instructs one of deceleration, acceleration, stop, restart, position control start, force control start, and error reset start, or a combination thereof. However, the motion instruction may instruct another motion.

For allowing the robot to change the motion in accordance with a user motion, the control device 200 of the robot 500 of the present embodiment performs processes in accordance with the following procedures.

Procedure 1: User-Motion Storage Process

The control device 200 analyzes and learns the way of touching (user motion) in which a human gives a motion instruction by touching the robot 500, and the user-motion storage portion 502 stores a similar type of the analyzed user motion. Note that when the control device 200 analyzes and learns a user motion, the control device 200 may use a so-called machine learning method that uses the neural net or the like.

Procedure 2: Motion-Instruction Storage Process

The motion-instruction storage portion 504 stores each of motion instructions given by a human touching the robot 500. As previously described, for example, the motion instruction instructs one of deceleration, acceleration, stop, restart, position control start, force control start, and error reset start, or a combination thereof.

The user-motion-and-motion-instruction associating portion 503 stores the relationship between a similar type of a user motion and a corresponding motion instruction.

Note that the restart may be a resume motion. In the resume motion, after the control device 200 determined that the robot 500 could not move for some reason, and stopped the robot 500, the control device 200 resumes the robot 500 that has been in the abnormal state. In the resume motion, the robot 500 is controlled so that a predetermined portion (in the present embodiment, the link 126 that is a leading and of the robot arm 100) is positional at a predetermined position. The predetermined position is set such that the leading end of the robot arm 100 of the robot 500 does not interfere with its surroundings, and is called a resume position or an origin position. If the restart instruction is given, the robot 500 moves the link 126 to the resume position or the origin position, to return from the abnormal state. In addition, an operator may associate an emergency-stop instruction, by which the operator immediately stops the robot 500 for some reason, with a user motion; and may cause the control device 200 to execute the emergency-stop instruction.

The force control start may be a start of a motion that brings a workpiece into contact with another workpiece. In this case, a predetermined hand is attached to the robot 500, and the workpiece is brought into contact with the other workpiece in accordance with the force detected by the torque detection device. The position control start may be a start of a motion that conveys a workpiece. In this case, a predetermined hand is attached to the robot 500, and the workpiece is conveyed by the hand. Such instructions for the force control start and the position control start may be used when the robot 500 is restarted.

Procedure 3: Motion Change Process in Accordance with User Motion

When a human touches the robot 500 in collaborative work, the user-motion analysis portion 501 detects a user motion by using an output signal from the torque detection device 20 of each joint and information on the user motion stored in the user-motion storage portion 502. Note that the user-motion analysis portion 501 can use a so-called learned model produced by using the neural net or the like.

If a user motion is detected, the user-motion-and-motion-instruction associating portion 503 identifies information on the motion instruction corresponding to the detected user motion, from among the information on the motion instruction stored in the motion-instruction storage portion 504.

The control device 200 accepts the identified information as a motion instruction, and then controls the motion of the robot 500 in accordance with the motion instruction.

Description of Procedures

Figure 5:
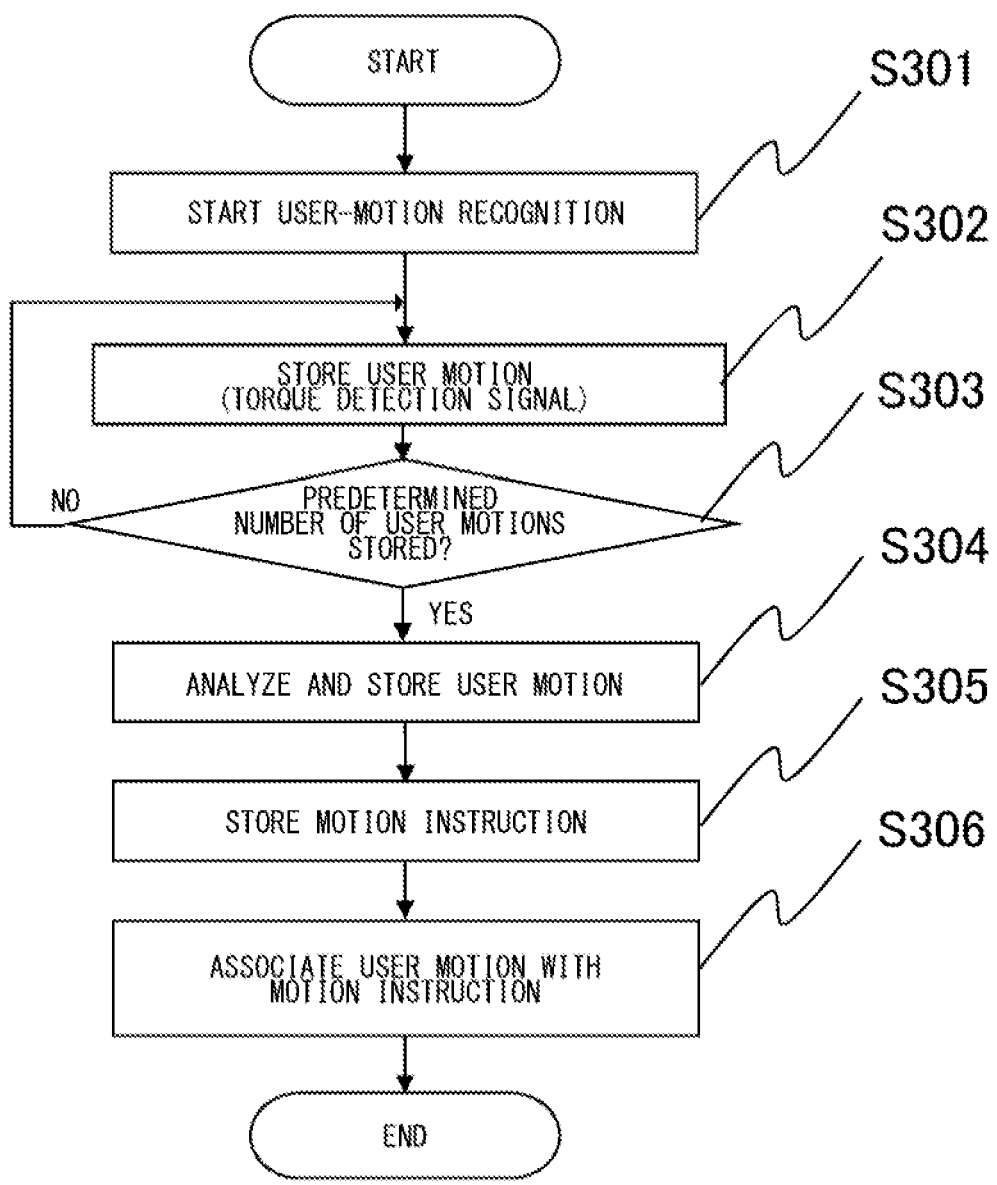
FIG. 5 is a flowchart of the whole of procedures 1 and 2 of an embodiment.
Figure 6:
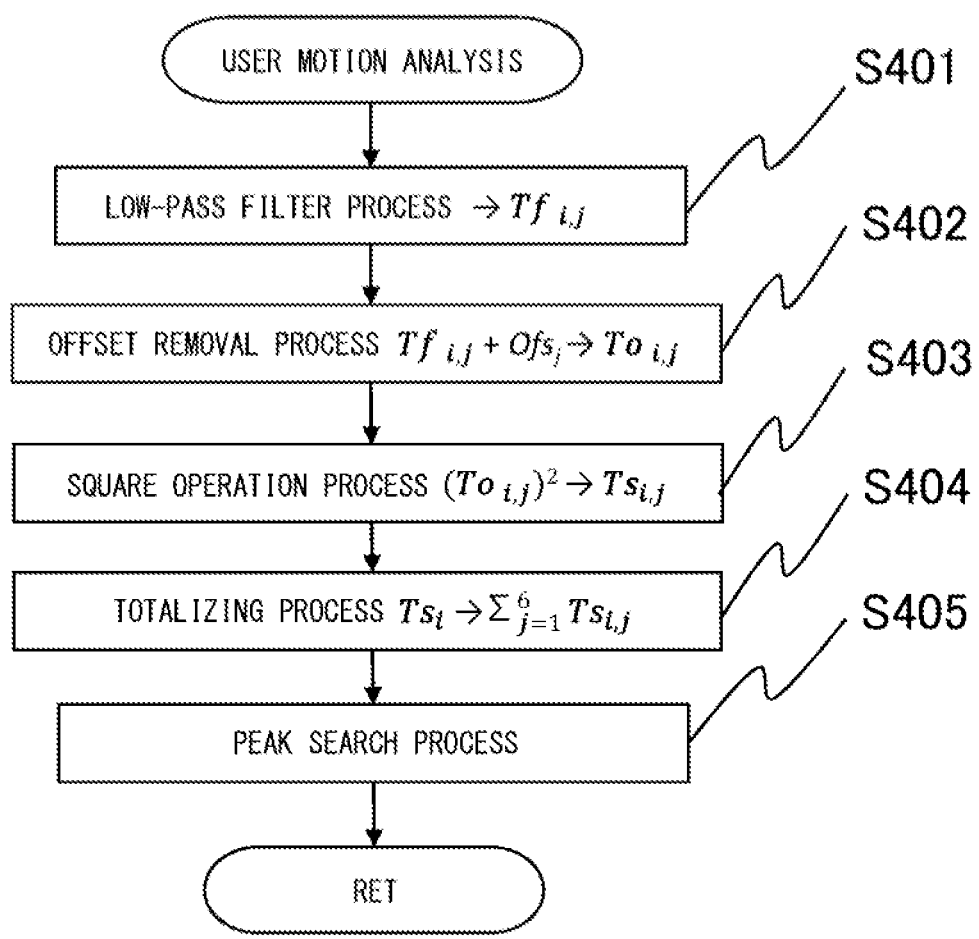
FIG. 6 is a flowchart of a user-motion analysis process of an embodiment.

First, the procedures 1 and 2 will be described with reference to flowcharts illustrated in FIGS. 5 and 6. FIG. 5 is a flowchart of the whole of the procedures 1 and 2. FIG. 6 is a flowchart of a user-motion analysis process included in the procedure 1.

Figure 7A:
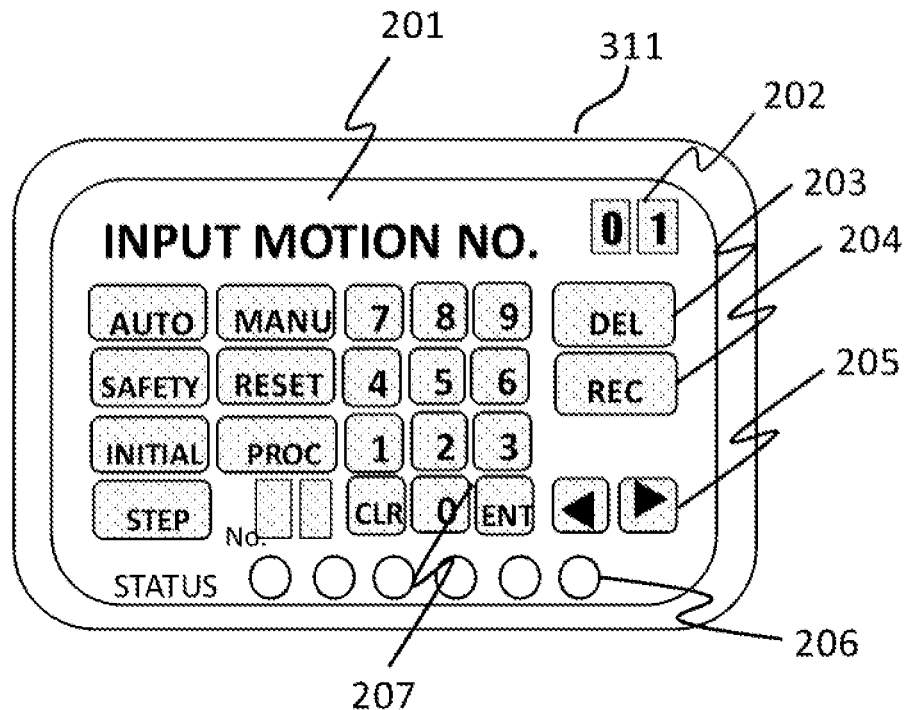
FIG. 7A is one example of a displayed image of an embodiment.

As illustrated in FIG. 5, in the procedure 1, a user-motion recognition start process is performed in Step S301. For example, Step S301 is started when an operator presses a start button of the system control panel 300, and a screen illustrated in FIG. 7A is displayed on the display portion 311 of the system control panel 300. Note that the display portion 311 may be a display device that only displays images, or may be a touch panel device that not only displays images but also receives input data.

As illustrated in FIG. 7A, the screw contains a mode display portion 201, a motion-registration-number display portion 202, a motion-registration cancel button 203, a motion storage button 204, a number forward/backward button 205, an operation-state display portion 206, and number input keys 207. In this step, the mode display portion 201 displays a message "INPUT MOTION" for prompting an operator to perform an input operation of a user motion.

Figure 7B:
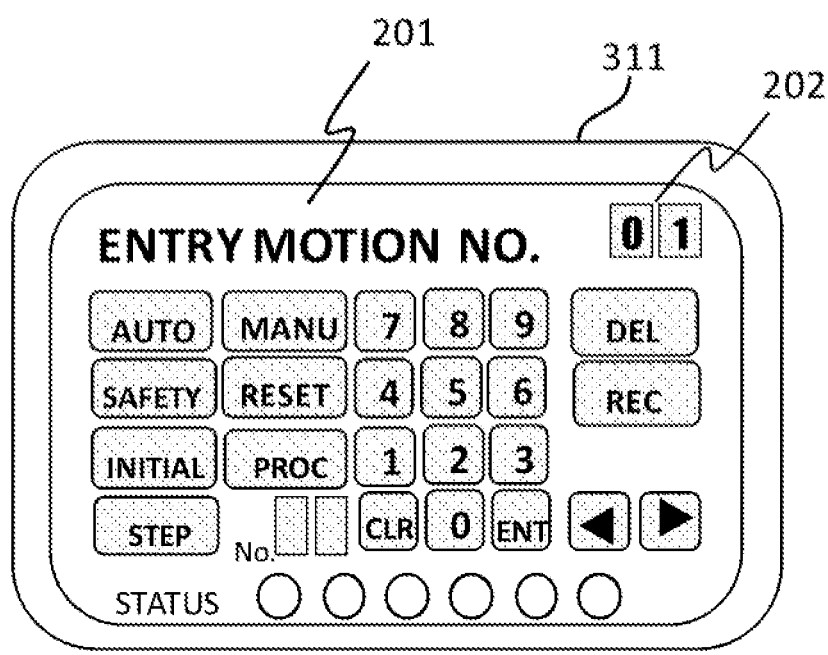
FIG. 7B is another example of a displayed image of an embodiment.
Figure 8A:
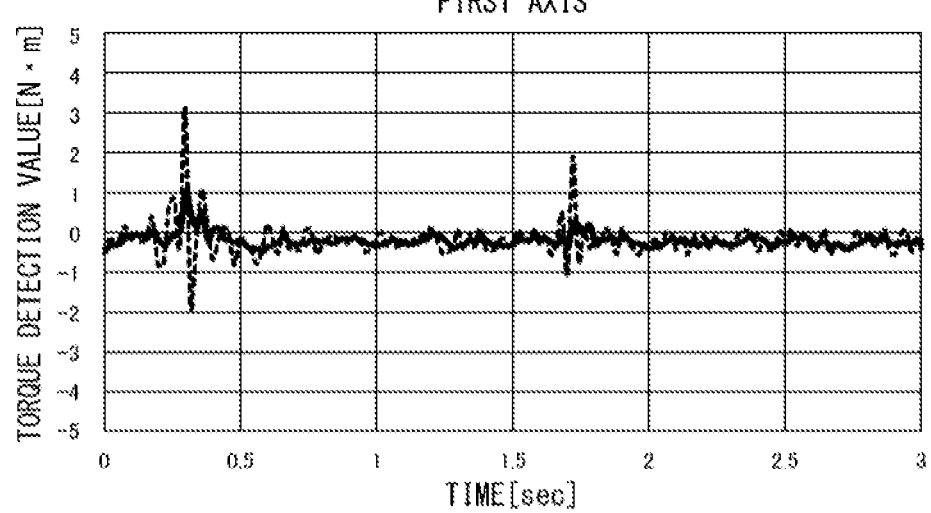
FIG. 8A is an example of a time-series torque detection signal caused by a user motion and detected in a first joint.
Figure 8B:
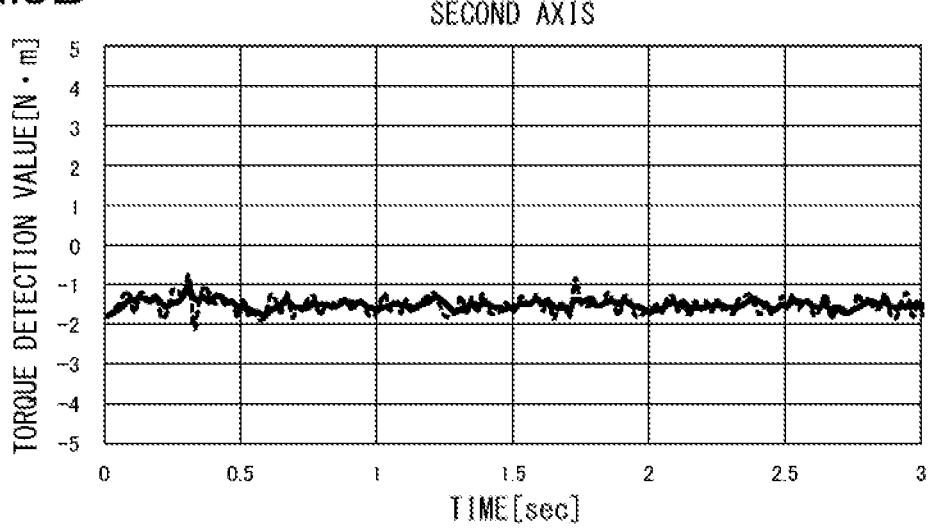
FIG. 8B is an example of a time-series torque detection signal caused by the user motion and detected in a second joint.
Figure 8C:
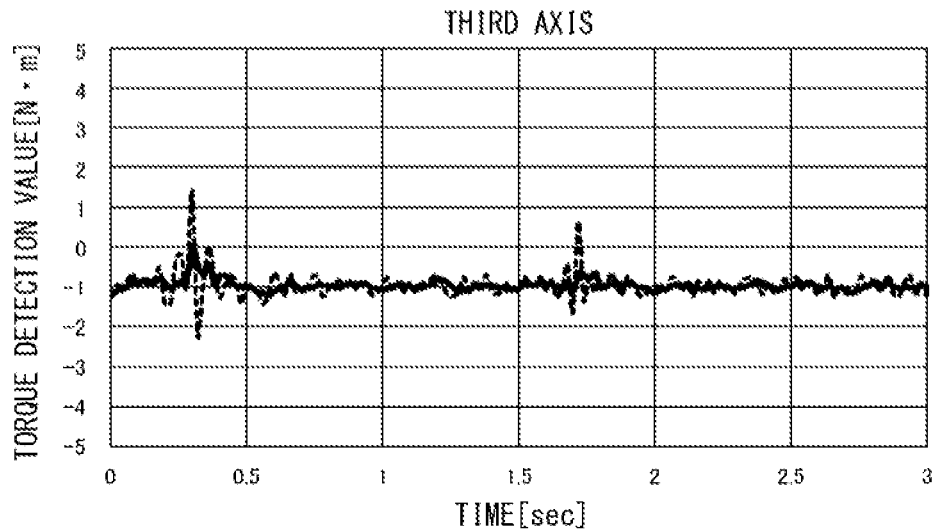
FIG. 8C is an example of a time-series torque detection signal caused by the user motion and detected in a third joint.
Figure 9A:
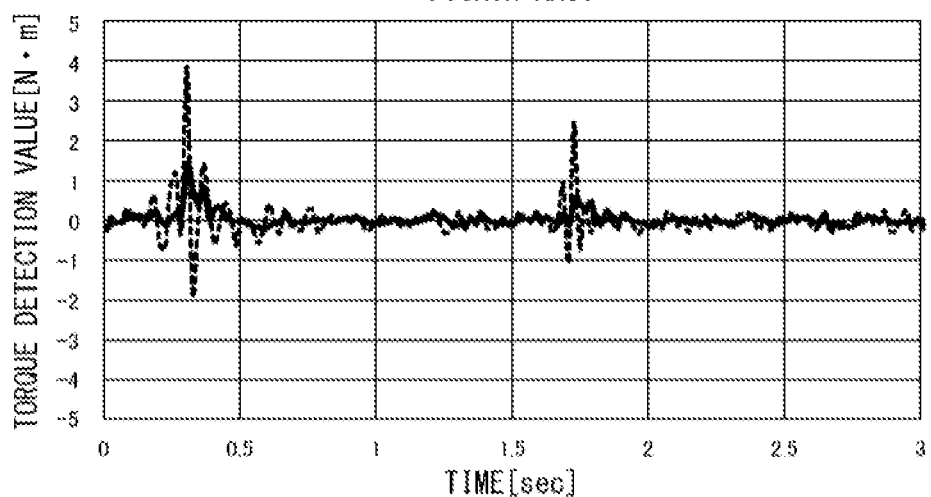
FIG. 9A is an example of a time-series torque detection signal caused by the user motion and detected in a fourth joint.
Figure 9B:
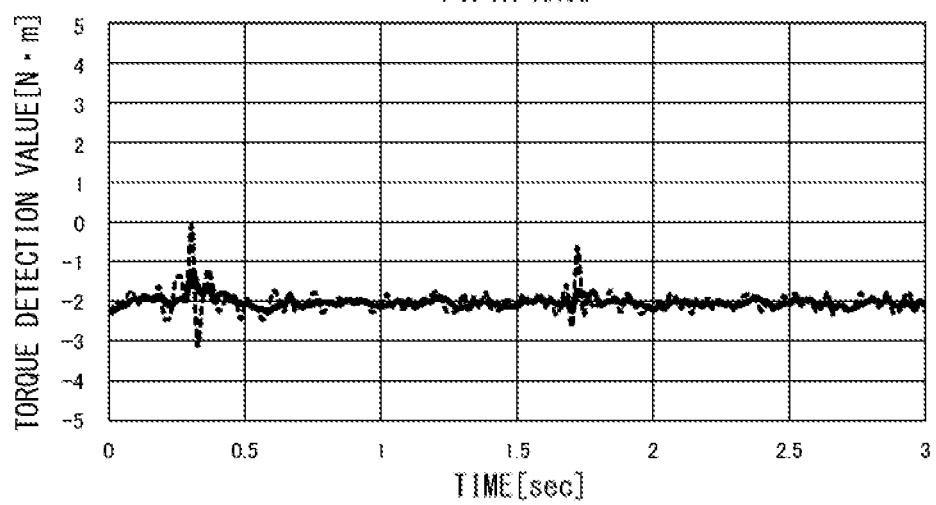
FIG. 9B is an example of a time-series torque detection signal caused by the user motion and detected in a fifth joint.
Figure 9C:
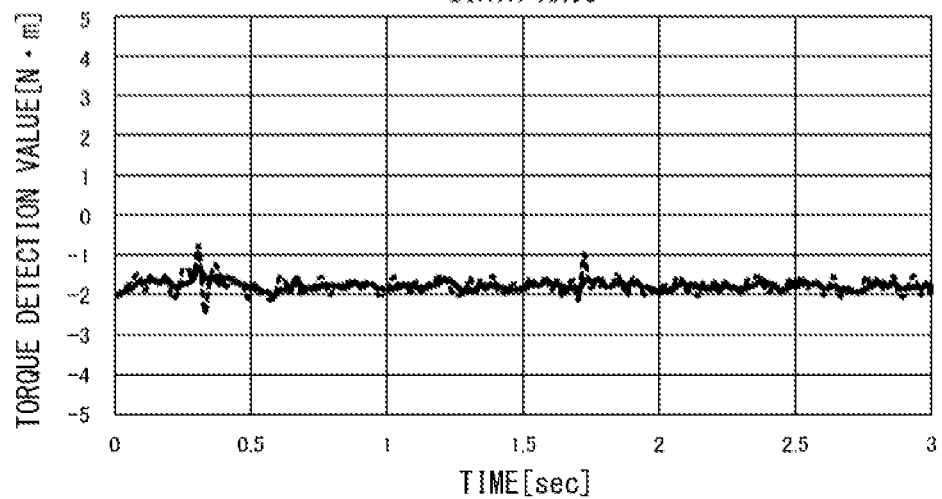
FIG. 9C is an example of a time-series torque detection signal caused by the user motion and detected in a sixth joint.

When the operator presses the motion storage button 204, Step S302 is started for storing a user motion, and a screen illustrated in FIG. 7B is displayed on the display portion 311. Specifically, the mode display portion 201 displays a message "ENTRY MOTION", and the motion-registration-number display portion 202 displays an identification number for distinguishing a user motion to be stored, from other user motions.

The operator inputs a user motion to be stored, by touching the robot 500. For example, if the operator desires to store one user motion that is to pat a side surface of the housing of the robot arm, twice, the operator performs the one user motion. While the operator is performing the user motion, a time-series output signal is transmitted from the torque detection device 20 of each of the joints 111 to 116, to the control device 200; and is stored in a memory of the control device 200. When the operator presses the motion storage button 204 again, the storage of the time-series torque detection signal corresponding to the user motion is completed.

In Step S303, it is determined whether the torque detection signals corresponding to a predetermined number of user motions (desired types of user motion) have been stored. For example, in a case where five types of user motion are desired to be stored, if the torque detection signals corresponding to the five types of user motion have been stored (Step S303: YES), then the pros, proceeds to Step S304. However, if the torque detection signals corresponding to the five types of user motion have not been stored (Step S303: NO), then the process returns to Step S302 and stores another user motion. That is, Step S302 is repeated until the predetermined number of user motions are stored.

If the time-series torque detection signals corresponding to the predetermined number of user motions are stored in the memory (Step S303: YES), then the process proceeds to Step S304 and the user-motion analysis portion 501 analyzes each use motion. That is, the user-motion analysis portion 501 analyzes the characteristics of the way of touching of each user motion, depending on the torque detection signal; and the analyzed characteristics are stored in the user-motion storage portion 502.

FIG. 6 is a flowchart of the user-motion analysis process of Step S304. FIGS. 8A to 8C and 9A to 9C are graphs of the time-series torque detection signals produced from one user motion and measured in the respective joints. The time-series torque detection signals are stored in the memory of the control device 200.

In Step S401, each of the time-series torque detection signals detected by a corresponding torque detection device is subjected to a low-pass filter process. In the graphs of FIGS. 8A to 8C and 9A to 9C, the torque detection signals detected by the torque detection devices are illustrated by dotted lines, and low-pass-filtered torque detection signals are illustrated by solid lines.

In Step S402, an offset removal process is performed. Specifically, the load applied to each joint of the robot anti is removed from the corresponding low-pass-filtered torque detection signal of the joint.

In Step S403, a square operation process is performed on the offset-removed torque detection signal of each joint.

In Step S404, a totalizing process is performed on the torque detection signals of the joints, on which the square operation process has been performed in Step S403. In the present embodiment, the torque detection signals of the six joints on which the square operation process has been performed are totalized.

Figure 10:
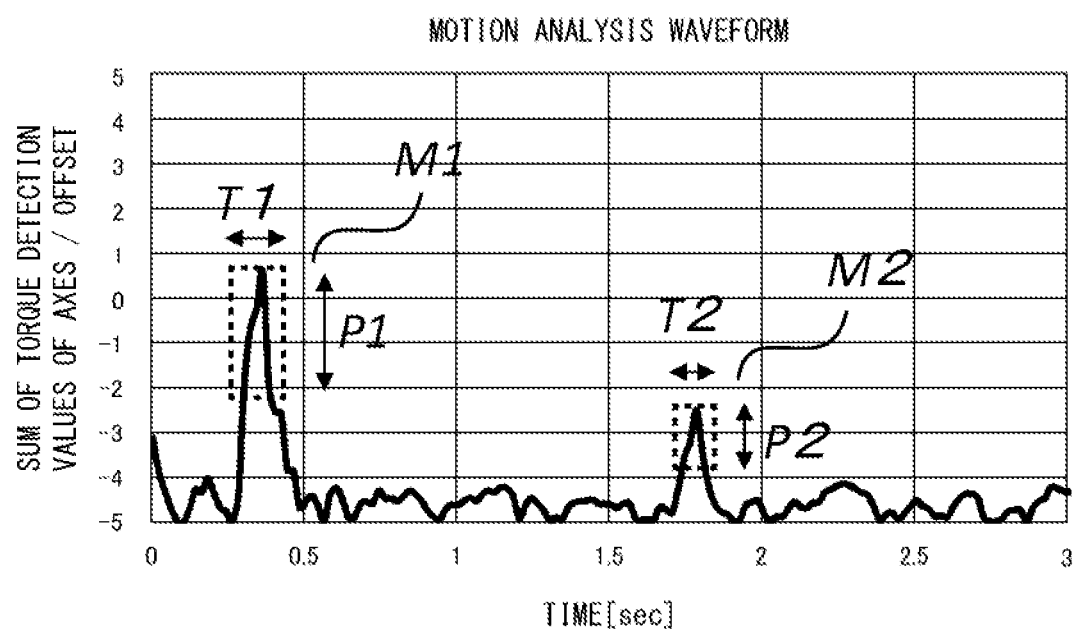
FIG. 10 is a graph of a motion analysis waveform in an embodiment.

The totalized result is referred to as a motion analysis waveform. FIG. 10 illustrates an example of a graph of the motion analysis waveform.

In Step S405, a peak search process is performed for performing feature extraction, for identifying a user motion by using the motion analysis waveform. First, a wave whose peak-to-peak value is larger than a preset threshold is extracted from the motion analysis waveform. In the example of FIG. 10, since the threshold is −3, two waves M1 and M2 are extracted.

Then, the area of each of the extracted waveforms is evaluated. For simplicity, a product of a half value of a peak-to-peak value and a half-value width in the time axis may be calculated. In the example of FIG. 10, a product S1 of a half value P1 of a peak-to-peak value and a half-value width T1 in the time axis is calculated for evaluating M1, and a product S2 of a half value P2 of a peak-to-peak value and a half-value width T2 in the time axis is calculated for evaluating M2.

Then, the product S1 calculated for M1 and the product S2 calculated for M2 are stored in the user-motion storage portion 502, as feature values of the user motion. That is, the products S1 and S2 are associated with an identification number displayed in the motion-registration-number display portion 202 of the display portion 311 of the system control panel 300, and stored in the user-motion storage portion 502.

Note that the feature values of the user motion are not limited to the above-described products S1 and S2. For example, the feature values may be a time interval between M1 and M2, peak values of M1 and M2, or information that identifies a joint in which the maximum value of the torque detection signals has been measured. In addition, for obtaining the feature values, fitting may be performed on a model waveform by using the least squares method, and the residuals may be determined; or otherwise, waveform pattern recognition that uses the machine learning or the like may be used.

Referring back to FIG. 5, after the characteristics of the user motions are analyzed and the storage of the characteristics of each user motion is completed in Step S304, the process proceeds to Step S305 that performs a motion-instruction storage process.

In Step S305, a motion instruction, which is to be given to the robot by a human performing a user motion (i.e., a predetermined motion in which the human touches the robot), is stored in the motion-instruction storage portion 504 of the control device 200. For example, the motion instruction instructs one of deceleration, acceleration, stop, restart, position control start, force control start, and error reset start, or a combination thereof.

In Step S306, a user-motion-and-motion-instruction associating process is performed. FIG. 13 is a schematic diagram for illustrating the user-motion-and-motion-instruction associating process. In the user-motion storage portion 502, the feature values of the user motions are associated with respective identifiers UM1, UM2, UM3, . . . , and stored. In the motion-instruction storage portion 504, the motion instructions are associated with respective identifiers F1, F2, F3, . . . , and stored.

In Step S306, each user motion is associated with a corresponding motion instruction, and is stored. Specifically, a table is created in the user-motion-and-motion-instruction associating portion 503, and the relationship between a user motion and a corresponding motion instruction is stored in the table.

Thus, an operator can resister the relationship between a user motion and a corresponding motion by using the system control panel 300.

When Step S306 is completed, the above-described procedures 1 and 2 are completed. Note that when Step S306 is completed, the display portion 311 of the system control panel 300 may display a list on which each user motion is associated with a corresponding motion instruction, for allowing an operator to easily understand the relationship between the user motion and the motion instruction.

Next, the above-described procedure 3, that is, a motion change process performed in accordance with a user motion will be described.

When the robot 500 is performing a predetermined motion, for example, in accordance with an operation program that has been taught, control information is created by the trajectory creation device of the control device 200, and the joints 111 to 116 are driven, depending on the control information, so that the position and posture of the robot arm 100 is controlled. In the present embodiment, while the robot 500 is operating, the user-motion analysis portion 501 monitors the torque detection signal sent from the torque detection device 20 of each of the joints. The user-motion analysis portion 501 detects a user motion by using the information on user motion, stored in the user-motion storage portion 502.

When a user motion is detected, the user-motion-and-motion-instruction associating portion 503 identifies a motion instruction corresponding to the detected user motion, from among the motion instructions stored in the motion-instruction storage portion 504. The control device 200 accepts the identified motion instruction, and changes the motion of the robot 500 in accordance with the motion instruction.

Figure 14:
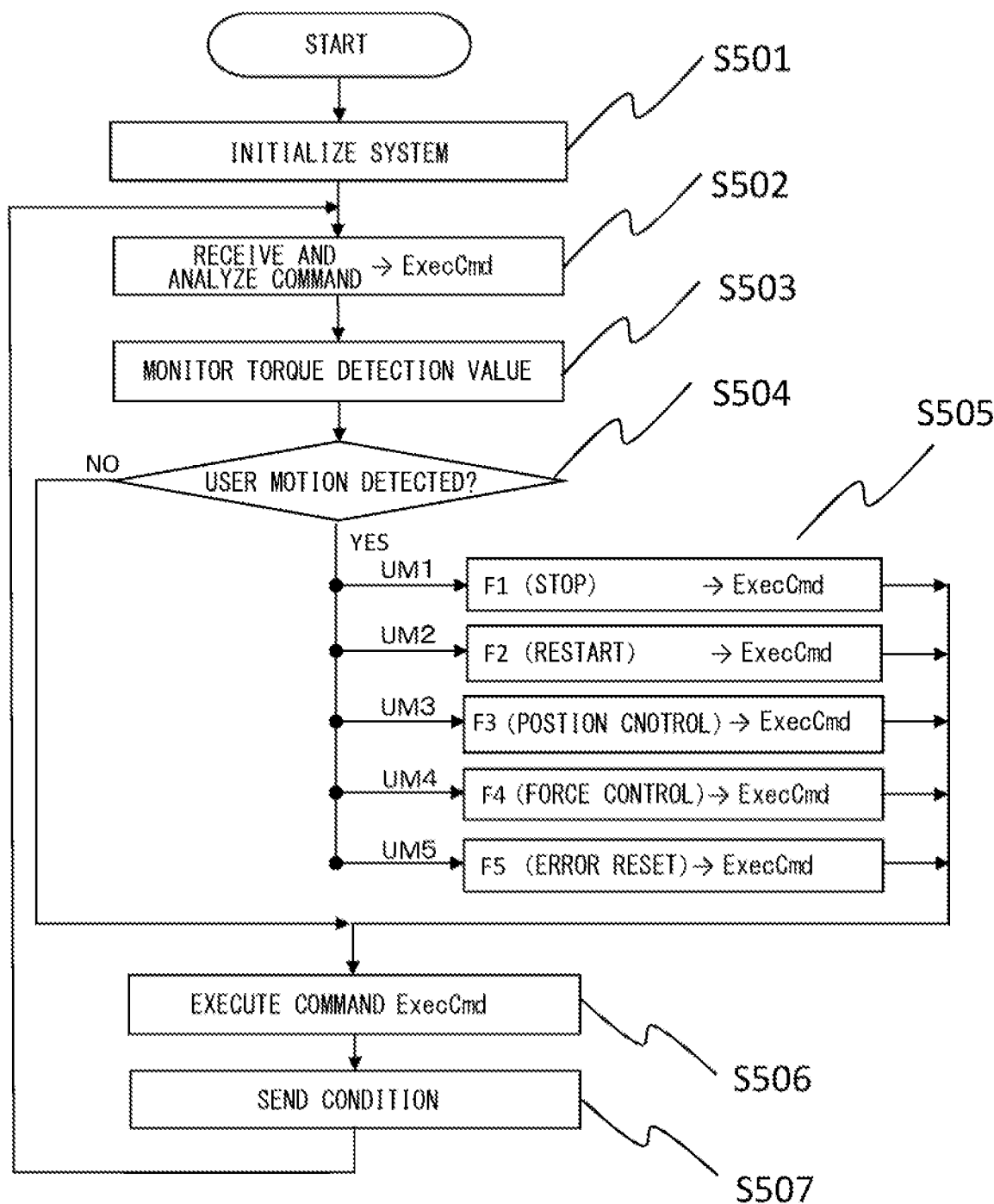
FIG. 14 is a flowchart of a procedure 3 of an embodiment.

With reference to a flowchart of FIG. 14, processes performed in the procedure 3 will be described.

After started up, the robot 500 executes Step S501 that is a system initialization process. The system initialization process includes sequence control; and in the sequence control, internal variables are initialized in an internal process, communication between internal components of the robot 500 and between the robot 500 and an external device is automatically established, and a power supply of each component is started up.

After the completion of Step S501, Step S502 is executed for setting a command for causing the robot 500 to perform a predetermined motion in accordance with an operation program. The control device 200 performs interactive communication, periodically with the joints 111 to 116. In addition, the control device 200 sets a control command created by the trajectory creation device, to an internal variable ExecCmd; and acquires state information from each joint.

After the execution of Step S502, Step S503 is executed for monitoring a torque detection signal measured by the torque detection device 20 of each joint. In Step S503, the user-motion analysis portion 501 performs the user-motion analysis process (see FIG. 6) by using the torque detection signal sent from each joint.

In Step S504, the user-motion analysis portion 501 determines whether a human has performed a user motion, by referring to the feature information stored in the user-motion storage portion 502.

If no user motion is detected (Step S504: NO), then the process proceeds to Step S506 while the control command that was set to the internal variable ExecCmd in Step S502 is kept, and executes the control command. That is, since there is no user motion, the process does not change the motion and executes the current command.

On the other hand, if a user motion is detected (Step S504: YES), then the process proceeds to Step S505, and the user-motion-and-motion-instruction associating portion 503 reads a motion instruction corresponding to the detected user motion, from the motion-instruction storage portion 504.

Then the process rewrites a control command corresponding to the motion instruction that has been read, into the internal variable ExecCmd. Then the process proceeds to Step S506, and executes the rewritten control command. In this case, since the user motion was detected, the motion has been changed in accordance with the motion instruction corresponding to the detected user motion.

After the execution of Step S506, the process proceeds to Step S507, and the information on the state of each joint of the robot arm is sent to the control device 200 via the communication line 146.

Then, the process returns to Step S502, and the steps S502 to S507 are repeated, for example, on a cycle of 10 milliseconds for the collaborative work between the human and the robot 500.

As described above, in the present embodiment when a human and a robot that performs collaborative work together with the human are performing collaborative work in a position where they are close to each other: the human can accurately and easily give a motion instruction to the robot. In particular, when a human and a robot are manufacturing products through collaborative work (for example, assembling components into a product, or machining such as grinding, cutting, or painting) in a position where they are close to each other, the human can accurately and easily give a motion instruction to the industrial robot.

Second Embodiment

In the first embodiment, the user motion obtained when a human touches a robot in collaborative work is analyzed by using the torque detection device disposed in each joint of the robot arm. However, the embodiments of the present invention are not limited to this.

A second embodiment described below differs from the first embodiment in that the user motion obtained when a human touches the main body of a robot in collaborative work is analyzed by using a touch panel attached to the robot arm. That is, in the present embodiment, the touch panel functions as a touch detection portion that detects a touch of an operator to the robot body, and the user-motion analysis portion that serves as a motion detection portion detects a motion of the operator by using an output signal from the touch panel. Hereinafter, the same features as those of the first embodiment will be omitted in the description, and different features from the first embodiment will be mainly described.

The touch panel used in the second embodiment may be any touch panel as long as the touch panel can be attached to the housing of the robot at a position where a human can easily touch the touch panel. In addition, the touch panel may be fixed to the robot, or may be detachably attached to the robot.

The touch panel may have any system as long as the touch panel can detect a touch of a human in the system. The touch panel may be attached onto a display screen.

Figure 15:
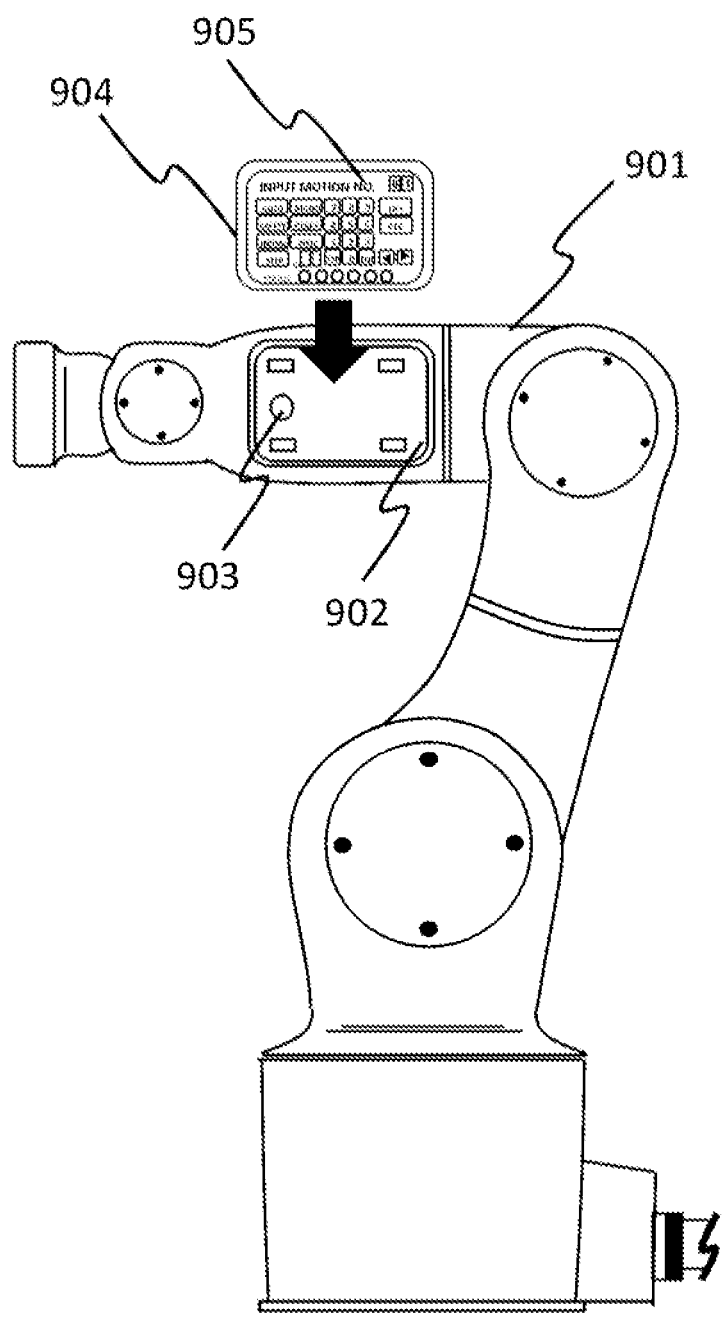
FIG. 15 is a diagram illustrating an external appearance of a robot arm of a robot of a second embodiment.

FIG. 15 is a diagram illustrating an external appearance of a robot arm of a robot of the second embodiment. A panel holder 902 is disposed on a side surface of a housing of a robot arm 901, and a touch panel 904 can be attached to the panel holder 902. Preferably, the touch panel 904 is designed so that an operator can perform user motions, such as long touch, short touch, sequential touch, repeated touch, flick, swipe, pinch, and line drawing, by touching the touch panel 904 with a finger. Suitably, at least one of the lengths of touch time, the strength of force applied in the touch, the direction of force applied in the touch, the cycle in the touch, the number of touches in a predetermined time, the touch position, and the trace of touch position is analyzed, so that the user motion is detected. With this analysis, at least one user motion of long touch, short touch, sequential touch, repeated touch, flick, swipe, pinch, and line drawing can be identified. In the present embodiment, the description will be made, as an example, for a case where the touch panel 904 includes a display screen 905 and can be used also as an operation panel, which can display the state of the robot arm and through which informations can be inputted into the robot.

The touch panel 904 can communicate with the control device 200, wirelessly or via wire. If the touch panel 904 communicates with the control device 200 wirelessly, the touch panel 904 may have a battery and communicate with the control device 200 by using infrared communications, wireless LAN, Bluetooth (registered trademark), or the like. If the touch panel 904 communicates with the control device 200 via wire, the touch panel 904 and the robot arm may be connected with each other via a connector 903, and a signal line and a power supply line may be connected to the touch panel 904 and the robot arm.

Since the touch panel 904 can be used also as an operation panel, the touch panel 904 may be used as a teaching pendant when teaching is performed, or may be used like the system control panel 300 of the first embodiment. However, when a human performs collaborative work in the vicinity of the robot, the touch panel 904 is used as a device for inputting a motion instruction by performing user motion. Thus, since the information processing device, such as a teaching pendant, through which a motion instruction can be inputted from the outside is detachably attached to a corresponding robot, an operator can instantaneously find which teaching pendant corresponds to which robot. Consequently, the operator can accurately give a motion instruction to the robot by using a corresponding teaching pendant.

In the present embodiment the way of touching (touch position, length of touch time, cycle, and the number of touches in a predetermined time) in which a human touches the touch panel 904 and the trace of touch position (change in touch position in time series) are analyzed as the characteristics of user motion.

Figure 16A:
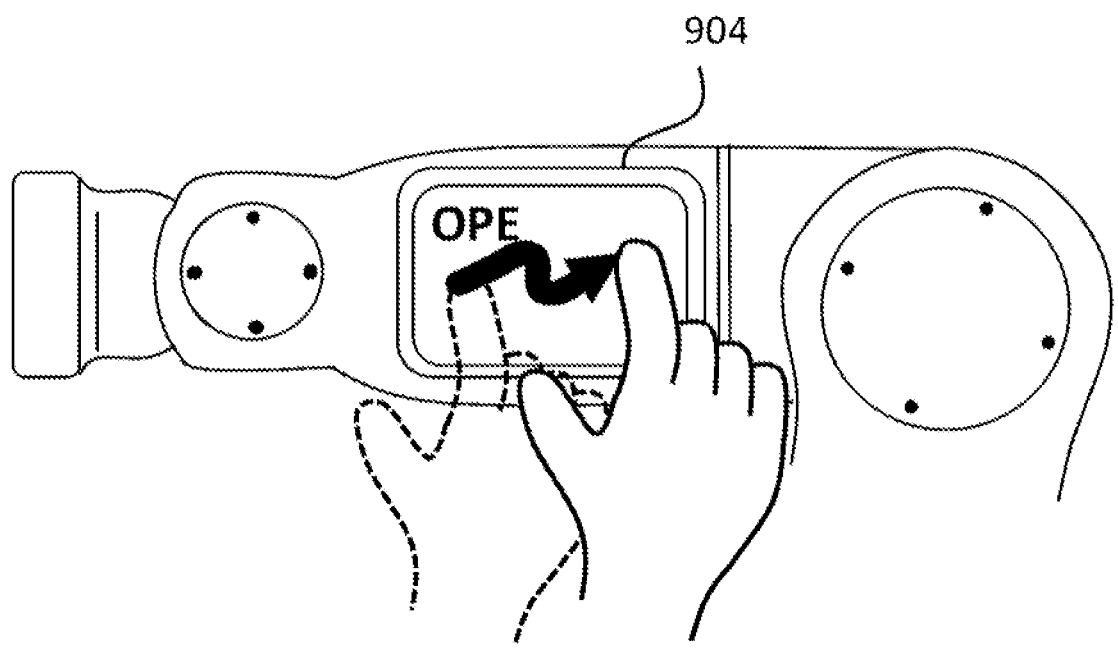
FIG. 16A is a diagram illustrating one example of user motion of the second embodiment.
Figure 16B:
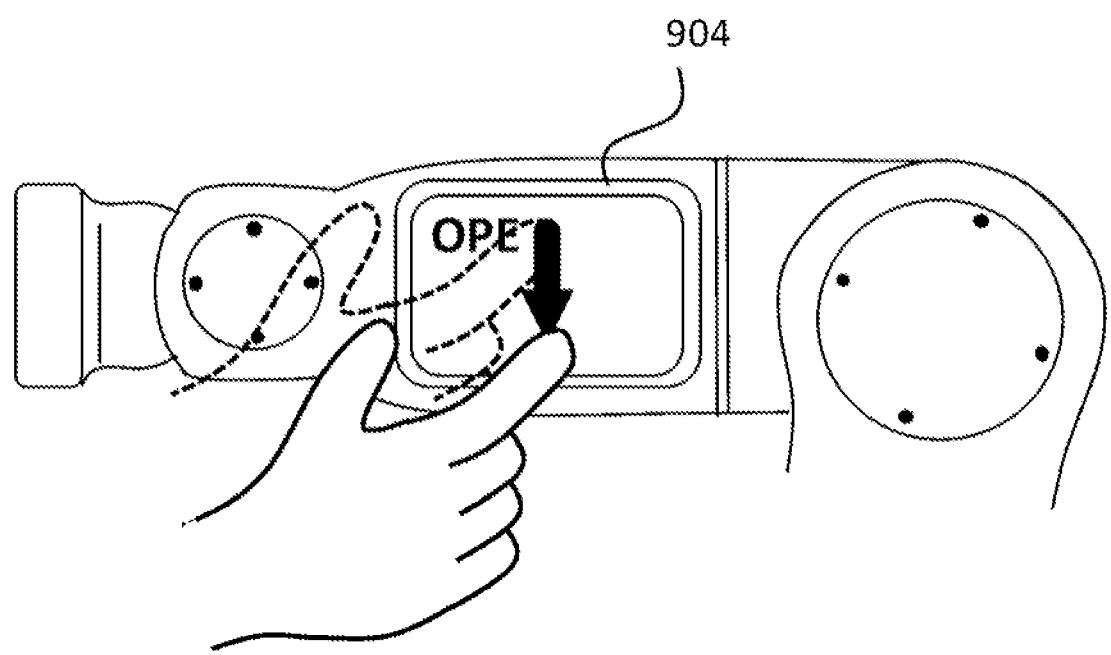
FIG. 16B is a diagram illustrating another example of user motion of the second embodiment.

FIG. 16A illustrates an example of a user motion that a human performs by touching the touch panel 904 for inputting a motion instruction. FIG. 16B illustrates an example of another user motion that a human performs by touching the touch panel 904 for inputting a motion instruction.

Also in the present embodiment, as in the first embodiment, a user motion is analyzed in advance before the robot performs collaborative work together with a human, and the characteristics of the user motion are stored in the user-motion storage portion. In addition, a motion instruction is stored in the motion-instruction storage portion, in advance. Furthermore, the relationship between a user motion and a corresponding motion instruction is stored in the user-motion-and-motion-instruction associating portion, in advance. For example, the user motion illustrated in FIG. 16A is associated with a motion instruction that stops the robot arm, and the user motion illustrated in FIG. 16B is associated with a motion instruction that restarts the robot arm.

Figure 17:
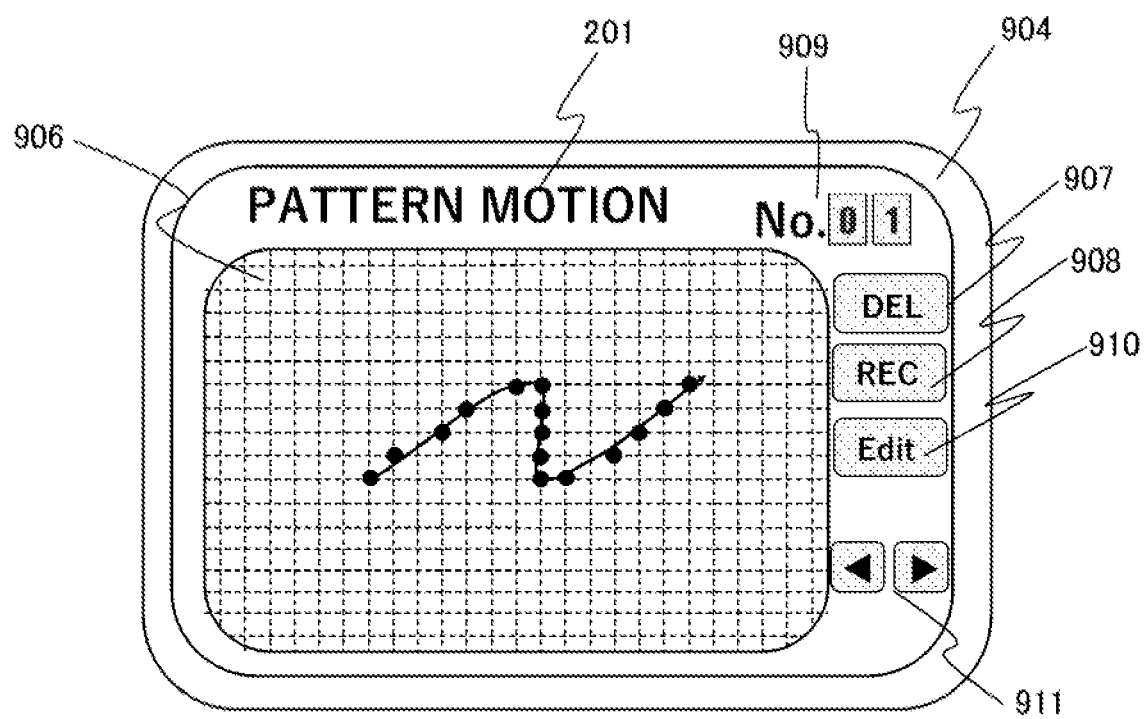
FIG. 17 is a diagram illustrating inputting a user motion in the second embodiment.
Figure 18:
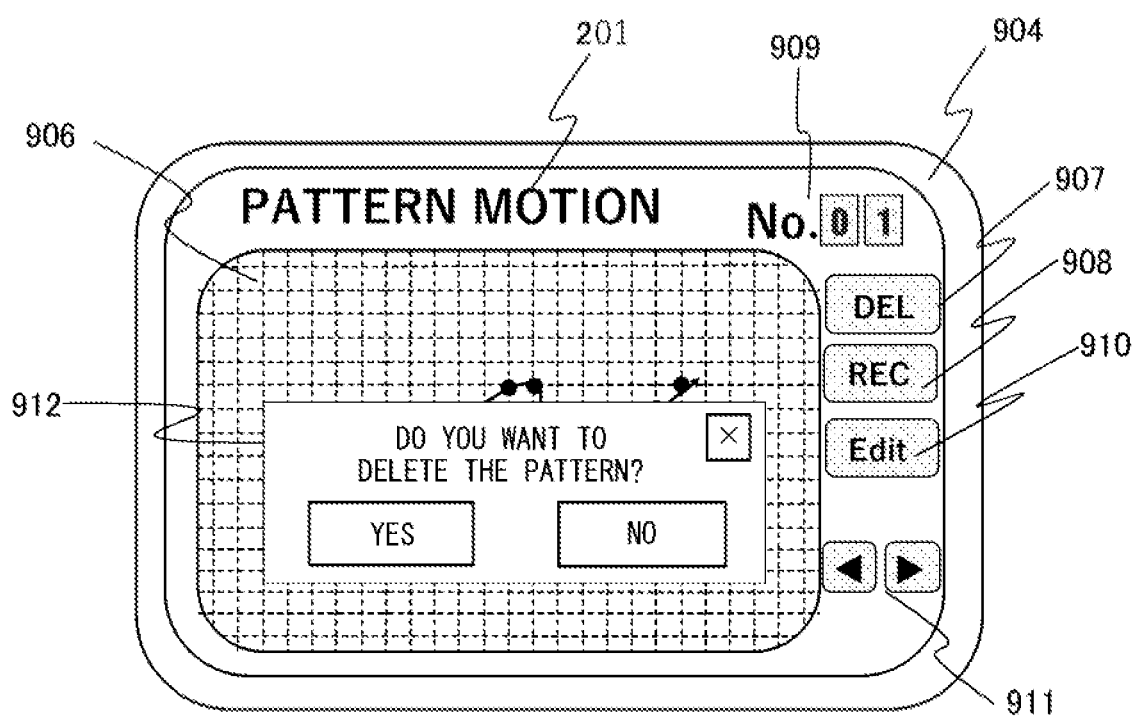
FIG. 18 is a diagram illustrating a pop-up of the second embodiment, displayed when a user motion is deleted.

As an example of the characteristics of user motions, the trace of touch position detected by the touch panel 904 is stored. Note that when the trace (pattern) of touch position is inputted as a user motion, the display of the mode display portion 201 of a display screen 905 is changed to "PATTERN MOTION", and a pattern input portion 906 is displayed, as illustrated in FIG. 17. In addition, a pattern delete button 907 and a pattern storage button 908 are displayed in the vicinity of the pattern input portion 906. When an operator desires to input a predetermined pattern in the pattern input portion 906 and store the pattern, the operator touches the pattern storage button 908. If the operator touches the pattern storage button 908, a pattern that the operator inputs will be stored. First, the pattern input portion 906 is cleared, and then the pattern registration number 909 is changed for prompting the operator to input a new pattern. If the pattern delete button 907 is touched, the pattern having been inputted in the pattern input portion 906 is deleted for allowing the operator to input another pattern. If the pattern delete button 907 is touched, a pop-up 912 is displayed, as illustrated in FIG. 18, for allowing the operator to confirm the delete of the pattern.

If the operator desires to edit a pattern that has already been registered, the operator touches a motion edit button 910. Then the pattern registration number 909 struts to blink. If the operator touches a number forward/backward button 911, the pattern registration number 909 chance while blinking, and patterns having been registered in the pattern input portion 906 are displayed in a sequential manner. If the operator touches the pattern delete button 907 in a state where a pattern that the operator desires to edit is displayed in the pattern input portion 906, the pop-up 912 illustrated in FIG. 18 is displayed.

After that, if the operator touches a "YES" button, the registered pattern is deleted. Then the operator can input a new pattern in the pattern input portion 906 for editing the pattern. The pattern registration number 909 blinks for allowing an operator to easily distinguish a mode to check registered patterns by using the number forward/backward button 911, from a mode to input a pattern. If an operator has mistakenly touched the motion edit button 910, or if the operator desires to merely check registered patterns, the operator touches the motion edit button 910 again. Then the pattern registration number 909 stops blinking.

Figure 19:
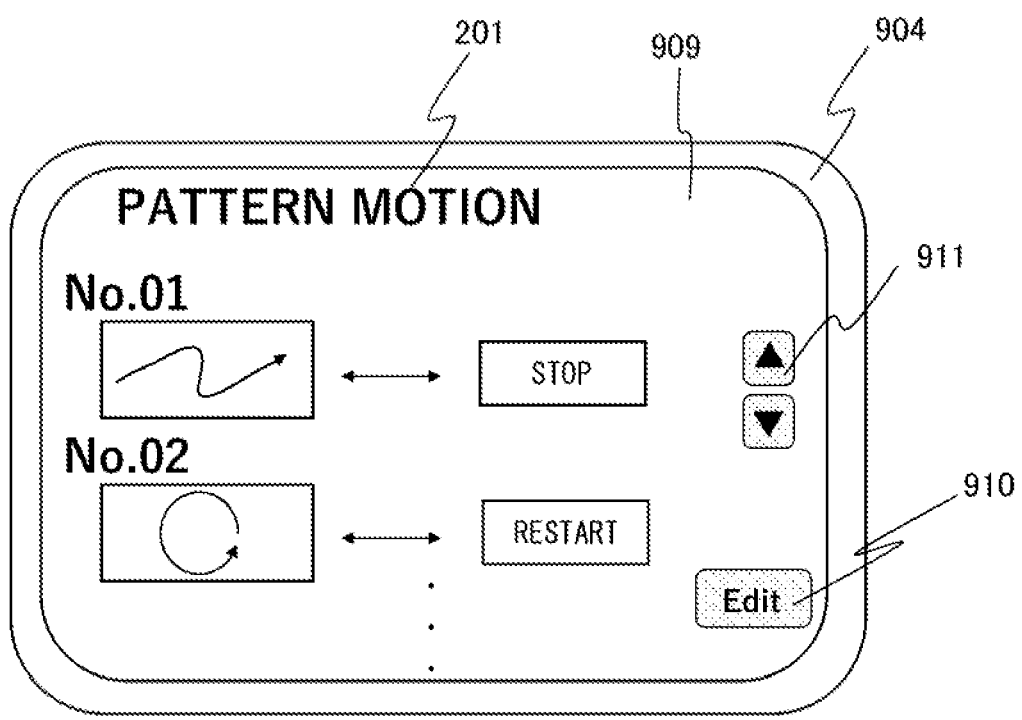
FIG. 19 is a diagram illustrating a list of user motions and motion instructions, of the second embodiment.

As described in the first embodiment, the display screen 905 may display a list on which each pattern is associated with a corresponding motion instruction, for allowing an operator to easily understand the relationship between the pattern and the motion instruction. FIG. 19 illustrates an example of the list on which each pattern is associated with a corresponding motion instruction. The pattern and the corresponding motion instruction can be displayed sequentially by pressing the number forward/backward button 911. In the present embodiment, each displayed pattern is provided with an arrow that indicates how the pattern has been inputted. Note that if an operator touches a portion in which a pattern is displayed, and then touches the motion edit button 910, the screen may be changed to the display screen illustrated in FIG. 17 and corresponding to the pattern, for allowing the operator to edit the pattern. Thus, since the user motion and the corresponding motion instruction are displayed in a list, an operator can easily understand the relationship between a pattern and a corresponding motion instruction. In addition, the display screen as illustrated in FIG. 19 may be used as part of an instruction manual of the robot. Note that the above-described display modes may be changed by pressing a button (not illustrated), or a physical button disposed on the touch panel 904.

When a user motion of a human is actually detected, the trace of touch position is detected by the touch panel 904, than the starting point, the slope, and the scale of the trace is corrected, and then the corrected trace is compared to a trace that has been stored in a memory. Specifically, fitting process is performed on the corrected trace and the trace stored in the memory, by using the least squares method; and a distance between both of the traces is calculated. If a variance is equal to or smaller than a preset threshold, it is determined that a user motion has been detected.

Note that when the characteristics of user motion are analyzed and learned, a so-called machine learning method that uses the neural net or the like can be used. In this case, for detecting a user motion while a robot is performing collaborative work, a so-called learned model produced by using the neural net or the like can be used.

In the second embodiment described above, when a human and a robot perform collaborative work, the human can accurately and easily give a motion instruction to the robot while performing the collaborative work in a position where they are close to each other. In particular, when a human and a robot are manufacturing products through collaborative work (for example, assembling components into a product, or machining such as grinding, cutting, or painting) in a position where they are close to each other, the human can accurately and easily give a motion instruction to the industrial robot.

Modifications

The present invention is not limited to the above-described embodiments, and may be variously modified or combined within the technical concept of the present invention.

For example, in the first embodiment, it is determined, in Step S303 of the flowchart of FIG. 5, whether the torque detection signals corresponding to desired types of user motion have been stored. However, the determination may be made in a different manner. For example, there is a case in which a predetermined number of measurement samples (learning data) is collected by causing an operator to perform one type of user motion, several times, for increasing the learning accuracy of the user motion. In this case, the process may determine in Step S303 whether the same type of user motion has been performed the predetermined number of times. In this case, in Step S303 that is a user motion analysis-and-storage process, a learned model on user motion may be produced by using the neural net and stored.

In addition, both of the torque detection device of the first embodiment and the touch panel of the second embodiment may be attached to an identical robot and used as a mechanism for detecting a user motion. In this case, the torque detection device and the touch panel may be used in parallel or alternatively, depending on situation.

The present invention can also be achieved by providing a program, which performs one or more functions of the above-described embodiments, to a system or a device via a network or a storage medium, and by a processor, which is included in the system or the device, reading and executing the program. In addition, the present invention can also be achieved by using a circuit, such as an ASIC, which performs one or more functions.

In addition, the above-described various embodiments can be applied for any machine that can automatically perform expansion and contraction motion, bending and stretching motion, up-and-down motion, right-and-left motion, pivot motion, or combination motion thereof, depending on information data stored in the storage device of the control device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020413019, filed Mar. 12, 2020, which is hereby incorporated by reference herein in its entirety.

What is claimed is:

1. A robot system comprising:
   an input detection portion configured to detect an input given from an operator to a robot body;
   a motion detection portion configured to detect a motion by using the input detection portion, the motion being given by the operator; and
   a control portion configured to execute an operation instruction associated with the motion detected by the motion detection portion,
   wherein, by an operation of the operator, the control portion is configured to cause a display portion to display an information on the motion of the operator and an information on the operation instruction associated with the motion of the operator.

2. The robot system according to claim 1, wherein the input detection portion is configured to detect the input by using a torque detection device provided in the robot body.

3. The robot system according to claim 1, wherein the input detection portion is configured to detect the input by using a touch panel attached to a robot arm of the robot body.

4. The robot system according to claim 3, wherein the touch panel is detachably attached to the robot arm.

5. The robot system according to claim 3, wherein the touch panel comprises the display portion.

6. The robot system according to claim 3, wherein the touch panel is configured to communicate with the control portion by using at least one of infrared communications, wireless LAN, Bluetooth, and wire via a connector.

7. The robot system according to claim 1, wherein the motion detection portion is configured to detect the motion given by the operator, by analyzing at least one of a length of input time of the input, a strength of force of the input, a direction of force in which the input is applied, a cycle of the input, a number of times of the input in a predetermined time, a position at which the input is applied, and a trace of the position of the input.

8. The robot system according to claim 7, wherein the input is performed by the operator touching the robot body.

9. The robot system according to claim 1, further comprising a user-motion storage portion configured to store information on a characteristic of the motion,
   wherein the motion detection portion is configured to detect the motion of the operator by using the information stored in the user-motion storage portion and using the input detection portion.

10. The robot system according to claim 9, wherein the user-motion storage portion is configured to store information on a characteristic of each of a plurality of patterns of motion,
    wherein the motion detection portion is configured to identify the motion of the input given by the operator, as one of the plurality of patterns of motion, and
    wherein the control portion is configured to execute an operation instruction associated with an identified pattern of motion.

11. The robot system according to claim 10, wherein the plurality of patterns comprises at least one of long touch, short touch, sequential touch, repeated touch, flick, swipe, pinch, and line drawing.

12. The robot system according to claim 1, wherein the control portion comprises an operation instruction storage portion configured to store an operation instruction that is executed when a corresponding motion is detected by the motion detection portion, and
    wherein the operation instruction comprises at least one of deceleration, acceleration, stop, restart, position control start, force control start, and error reset start.

13. The robot system according to claim 12, wherein the instruction for the restart is an instruction to control the robot for moving a predetermined portion of the robot to a predetermined position.

14. The robot system according to claim 13, wherein the predetermined position is a resume position, and the instruction for the restart is an instruction to control the robot for resuming the robot from a state in which the robot is stopped due to an abnormal condition.

15. The robot system according to claim 12, wherein the instruction for the force control start is an instruction to control the robot in accordance with a force value.

16. The robot system according to claim 12, wherein the instruction for the position control start is an instruction to control the robot in accordance with a position value.

17. The robot system according to claim 1, wherein the display portion is configured to display a motion-registration cancel button and a motion storage button.

18. The robot system according to claim 1, wherein the display portion is configured to display a motion-registration-number display portion and a number forward/backward button.

19. The robot system according to claim 1, wherein the display portion is configured to display a motion edit button, and a motion-registration-number display portion blinks if the motion edit button is touched.

20. The robot system according to claim 19, wherein if a number forward/backward button is touched in a state where the motion-registration-number display portion is blinking, a motion corresponding to a motion registration number is displayed in a sequential manner.

21. The robot system according to claim 1, wherein, when a number forward/backward button is selected by the operator, the control portion is configured to cause a display portion to display the information on the motion of the operator and the information on the operation instruction associated with the motion of the operator in a sequential manner.

22. The robot system according to claim 1, wherein the control portion is configured to acquire a feature values of a user motion by using residual judgment after fitting by the least squares method with a model waveform; or waveform pattern recognition using machine learning.

23. The robot system according to claim 1, wherein, by the operation of the operator, the control portion is configured to cause the display portion to display a list including the information on the motion of the operator and the information on the operation instruction associated with the motion of the operator.

24. The robot system according to claim 1, wherein the control portion is configured to cause the display portion to display the information on the motion of the operator, the information being provided with an arrow that indicates how the information has been inputted by the operator.

25. The robot system according to claim 1, wherein the control portion is configured to cause the display portion to display a motion edit button, accept a selection of the information on the motion displayed on the display portion, and accept edition of the information on the motion by accepting an input of the motion edit button.

26. A control device comprising:
a motion detection portion configured to detect a motion by using an input detection portion, the input detection portion being configured to detect an input given from an operator to a robot body, the motion being given by the operator; and
a control portion configured to cause the robot body to execute an operation instruction associated with the motion detected by the motion detection portion,
wherein, by an operation of the operator, the control portion is configured to cause a display portion to display an information on the motion of the operator and an information on the operation instruction associated with the motion of the operator.

27. An information processing device comprising:
a motion detection portion configured to detect a motion by using an input detection portion, the input detection portion being configured to detect an input given from an operator to a robot body, the motion being given by the operator; and
a control portion configured to output an operation instruction associated with the motion detected by the motion detection portion,
wherein, by an operation of the operator, the control portion is configured to cause a display portion to display an information on the motion of the operator and an information on the operation instruction associated with the motion of the operator.

28. A control method comprising:
detecting an input given from an operator to a robot body;
detecting a motion given by the operator; and
causing the robot body to execute an operation instruction associated with the detected motion,
wherein, by an operation of the operator, causing a display portion to display an information on the motion of the operator and an information on the operation instruction associated with the motion of the operator.

29. A method of manufacturing a product by using the robot body that is controlled by the control method according to claim 28.

30. A computer-readable non-transitory recording medium storing a program that causes a computer to perform the control method according to claim 28.

* * * * *